US011440448B2

(12) United States Patent
Fujita et al.

(10) Patent No.: US 11,440,448 B2
(45) Date of Patent: Sep. 13, 2022

(54) SUSPENSION MECHANISM, MULTI-SUSPENSION MECHANISM AND DAMPER

(71) Applicant: DELTA KOGYO CO., LTD., Aki-gun (JP)

(72) Inventors: Etsunori Fujita, Higashihiroshima (JP); Eiji Sugimoto, Aki-gun (JP); Yumi Ogura, Higashihiroshima (JP); Soichi Makita, Aki-gun (JP); Masahiro Mashino, Aki-gun (JP); Shigeyuki Kojima, Aki-gun (JP); Atsushi Nishida, Aki-gun (JP); Jun Fukuda, Aki-gun (JP); Ryuji Kuwano, Aki-gun (JP)

(73) Assignee: DELTA KOGYO CO., LTD., Aki-gun (JP)

( * ) Notice: Subject to any disclaimer, the term of this patent is extended or adjusted under 35 U.S.C. 154(b) by 0 days.

(21) Appl. No.: 17/057,203

(22) PCT Filed: May 20, 2019

(86) PCT No.: PCT/JP2019/019909
§ 371 (c)(1),
(2) Date: Nov. 20, 2020

(87) PCT Pub. No.: WO2019/225543
PCT Pub. Date: Nov. 28, 2019

(65) Prior Publication Data
US 2021/0309133 A1 Oct. 7, 2021

(30) Foreign Application Priority Data

May 22, 2018 (JP) .............................. JP2018-098352
Sep. 28, 2018 (JP) .............................. JP2018-186177

(51) Int. Cl.
*B60N 2/52* (2006.01)
*B60N 2/50* (2006.01)
*B60N 2/54* (2006.01)

(52) U.S. Cl.
CPC .............. *B60N 2/522* (2013.01); *B60N 2/507* (2013.01); *B60N 2/548* (2013.01)

(58) Field of Classification Search
CPC ........ B60N 2/502; B60N 2/505; B60N 2/507; B60N 2/522; B60N 2/527; B60N 2/54;
(Continued)

(56) References Cited

U.S. PATENT DOCUMENTS 3,160,233 A * 12/1964 Norman .................. F16F 1/371
188/268
4,312,491 A * 1/1982 Aondetto ............... B60N 2/502
248/575

(Continued)

FOREIGN PATENT DOCUMENTS

JP 47-50938 12/1972
JP 7-223475 A 8/1995
(Continued)

OTHER PUBLICATIONS

International Search Report dated Jul. 30, 2019 in PCT/JP2019/019909 filed on May 20, 2019, 2 pages.

*Primary Examiner* — James M Ference
(74) *Attorney, Agent, or Firm* — Oblon, McClelland, Maier & Neustadt, L.L.P.

(57) ABSTRACT

There are improved a vibration absorption characteristic and an impact absorption characteristic. In a suspension mechanism 1 of the present invention, first and second dampers (150, 160) are suspended in parallel between an upper frame (120) and a lower frame (110) with mounting angles different from each other. For this reason, the smaller mounting angle the damper has, the smaller a vertical component of
(Continued)

damping force becomes, and the damping force which acts on the upper frame (120) and the lower frame (110) which move up and down relatively is moderate in effectiveness as compared with a case of disposing all the dampers at the same mounting angle. Thus, a sense of incongruity in which strong damping force acts abruptly is suppressed and the vibration absorption characteristic and the impact absorption characteristic are improved, which leads to improvement in ride comfort.

12 Claims, 24 Drawing Sheets

(58) Field of Classification Search
CPC ......... B60N 2/544; B60N 2/548; F16F 6/005; F16F 7/09; F16F 15/022; F16F 15/03; F16F 2222/04; F16F 2222/06
See application file for complete search history.

(56) References Cited

U.S. PATENT DOCUMENTS

| | | | | |
|---|---|---|---|---|
| 6,059,253 A * | 5/2000 | Koutsky | ............... | B60N 2/501 248/550 |
| 6,336,627 B1 * | 1/2002 | Fujita | ............... | B60N 2/544 267/131 |
| 6,366,190 B1 * | 4/2002 | Fujita | ............... | F16F 6/005 248/564 |
| 2002/0027050 A1 * | 3/2002 | Takakusaki | ............... | F16F 9/062 188/321.11 |
| 2005/0116516 A1 * | 6/2005 | Robinson | ............... | B60N 2/505 297/233 |
| 2007/0029854 A1 * | 2/2007 | Robinson | ............... | B60N 2/501 297/344.17 |
| 2007/0284927 A1 * | 12/2007 | Therer | ............... | B60N 2/501 297/344.12 |
| 2010/0117275 A1 * | 5/2010 | Nakamura | ............... | E02F 9/166 267/133 |
| 2012/0007294 A1 * | 1/2012 | Fujita | ............... | B60N 2/548 267/131 |
| 2014/0300123 A1 * | 10/2014 | Oshimo | ............... | F16F 15/03 296/3 |
| 2016/0082870 A1 * | 3/2016 | Fujita | ............... | B60N 2/54 248/561 |
| 2017/0086590 A1 * | 3/2017 | Fujita | ............... | A47C 7/02 |
| 2017/0232871 A1 * | 8/2017 | Asai | ............... | B60N 2/16 297/344.15 |
| 2020/0070695 A1 * | 3/2020 | Fujita | ............... | F16F 15/03 |
| 2020/0108751 A1 * | 4/2020 | Dotzler | ............... | B60N 2/54 |
| 2020/0114789 A1 * | 4/2020 | Fujita | ............... | B60N 2/505 |
| 2020/0271181 A1 * | 8/2020 | Fujita | ............... | F16F 7/09 |
| 2021/0309133 A1 * | 10/2021 | Fujita | ............... | B60N 2/544 |

FOREIGN PATENT DOCUMENTS

| | | |
|---|---|---|
| JP | 10-203221 A | 8/1998 |
| JP | 2010-179719 A | 8/2010 |
| JP | 2010-179720 A | 8/2010 |
| JP | 2014-28698 A | 2/2014 |
| WO | WO 2008/117669 A1 | 10/2008 |
| WO | WO 2018/025992 A1 | 2/2018 |

* cited by examiner

SUSPENSION MECHANISM, MULTI-SUSPENSION MECHANISM AND DAMPER

TECHNICAL FIELD

The present invention relates to a suspension mechanism, a multi-suspension mechanism, which are suitable for support for a seat of a vehicle, and a damper.

BACKGROUND ART

Patent Documents 1, 2 disclose a seat suspension in which an upper frame provided to be movable up and down relative to a lower frame is elastically supported by a magnetic spring and torsion bars. It is disclosed that, in a case where a characteristic that restoring force of a magnetic spring in the same direction as a working direction of restoring force of the torsion bars increases in accordance with an increase in a displacement amount is referred to as "a positive spring characteristic (a spring constant at this time is referred to as "a positive spring constant") and a characteristic that the restoring force of the magnetic spring in the same direction as the working direction of the restoring force of the torsion bars decreases in spite of the increase in the displacement amount is referred to as "a negative spring characteristic (a spring constant at this time is referred to as "a negative spring constant"), by making use of the fact that the magnetic spring exhibits the negative spring characteristic in a predetermined displacement range and combining the magnetic spring with the torsion bars exhibiting the positive spring characteristic, the suspension has a region where a characteristic of a constant load where a load value relative to a displacement amount in the whole system resulting from the superposition of the characteristics of both in the predetermined displacement range is substantially constant (a spring constant is substantially zero) is exhibited.

PRIOR ART DOCUMENT

Patent Document

Patent Document 1: Japanese Patent Application Laid-open No. 2010-179719
Patent Document 2: Japanese Patent Application Laid-open No. 2010-179720

SUMMARY OF THE INVENTION

Problems to be Solved by the Invention

The suspension of Patent Documents 1, 2 are configured such that, owing to the aforesaid structure using the magnetic spring and the torsion bars, normal vibrations having predetermined frequencies and amplitudes are absorbed using the constant load region where the spring constant resulting from the superposition of the spring constants of both is substantially zero, while energy caused by impact vibration is absorbed by a damper suspended between the upper frame and the lower frame.

However, in a case of a driver seat of an earth-moving machine, because there are many occasions to run on a road surface having large bumps and potholes, it is necessary to put emphasis on measures against impact vibration having a larger amplitude, and it is necessary to, after the excitation according to the input spectral classes (ISO 10326-1) defined in JIS A 8304:2001 "Earth moving machinery—Laboratory evaluation of operator seat vibration" based on ISO 7096:2000 and determined depending on the kinds of machines, satisfy each SEAT value (Seat Effective Amplitude Transmissibility factor). For example, in a case of "a crawler tractor-dozer ≤50,000 kg, a crawler loader and a crawler rough terrain truck", it is necessary to, after the excitation according to the input spectral class: EM6 (a 7.6 Hz dominant frequency, a 0.34 $(m/s^2)^2/Hz$ maximum value of PSD), satisfy a SEAT value: less than 0.7, and in a case of "a compact loader", it is necessary to, after the excitation according to the input spectral class: EM8 (a 3.3 Hz dominant frequency, a 0.4 $(m/s^2)^2/Hz$ maximum value of PSD), satisfy a SEAT value: less than 0.8. Further, a vibration transmissibility in a resonant frequency in a vertical axis direction is required to be 1.5 or less in EM6 and to be 2.0 or less in EM8.

However, for example, although the vibration transmissibility required in EM6 being 1.5 or less can be achieved by having a structure of putting emphasis on a damping property by nature, a reduction in the vibration transmissibility in such a high-frequency band as the 7.6 Hz dominant frequency in EM6 is required to have a structure of strengthening a spring characteristic to generate an opposite phase. Similarly, although the vibration transmissibility required in EM8 being 2.0 or less can be achieved by having a structure of having a strong spring characteristic by nature, a reduction in the vibration transmissibility in such a low-frequency band as the 3.3 Hz dominant frequency is required to strengthen the damping property as well.

Thus, in order to satisfy the standards for the SEAT values and the vibration transmissibilities corresponding to the input spectral classes demanded for the earth-moving machines, a balance between the spring characteristic and the damping property is to be sufficiently taken into consideration. However, this has been difficult to achieve with a single suspension of a single-degree-of-freedom system which incorporates a spring and a damper therein.

The present invention was made in consideration of the above problem, and has an object to provide a suspension mechanism and a multi-suspension mechanism for seat support which allow a vibration absorption characteristic and an impact absorption characteristic capable of responding to various kinds of input vibration to be exhibited. Further, the present invention has an object to provide a damper suitable for being used for these suspension mechanism and multi-suspension mechanism.

Means for Solving the Problems

In order to solve the aforesaid problem, the suspension mechanism of the present invention is a suspension mechanism disposed between a vehicle body structure and a seat, the suspension mechanism includes:

a link mechanism which supports an upper frame mounted on the seat side to be movable up and down relative to a lower frame mounted on the vehicle body structure side;

a spring mechanism which elastically biases the upper frame relative to the lower frame; and a damper which exhibits damping force to absorb energy when the upper frame moves up and down relative to the lower frame, wherein the damper is a telescopic one including a cylinder and a piston which moves relatively in the cylinder in accordance with up-down movement of the upper frame relative to the lower frame, and suspended in plurality in parallel at different mounting angles between the upper frame and the lower frame.

Preferably, in at least one of the plurality of dampers, a moving zone of the piston in the cylinder corresponding to a predetermined up-down movement range including a balanced point when the upper frame moves up and down relative to the lower frame is a free running zone where the damping force does not act.

Preferably, the free running zone is set in the plurality of dampers, and distances of the free running zones in at least the two dampers are different from each other.

Preferably, the cylinder has an outer stationary cylinder linked to one of the upper frame and the lower frame and an inner movable cylinder provided to be movable in the outer stationary cylinder, the piston is arranged in the inner movable cylinder and supported ley a piston rod linked to the other of the upper frame and the lower frame, around an outer peripheral surface of the piston, a linear member which exhibits friction damping force between the inner movable cylinder and the piston is wound, and a viscous fluid is made to adhere to the linear member, the linear member has a function in which tension is charmed by relative movement of the piston in the cylinder, thereby changing friction damping force between the linear member and the inner movable cylinder and viscous damping force of the viscous fluid, and the damping force is exhibited when the inner movable cylinder does not move relatively in the outer stationary cylinder and the piston moves relatively in the inner movable cylinder.

Preferably, the spring mechanism has a characteristic in which a change amount of a load value is a constant load equal to or less than a predetermined amount in a predetermined up-down movement range including the balanced point as a load-deflection characteristic when the upper frame moves up and down relative to the lower frame.

Preferably, the spring mechanism includes:

a linear spring which exhibits a linear characteristic; and a magnetic spring which includes stationary magnets and a movable magnet whose relative position to the stationary magnets is displaced in accordance with up-down movement of the upper frame relative to the lower frame, and exhibits a nonlinear characteristic in which a spring constant is changed depending on a relative position of the stationary magnets and the movable magnet, and a load-deflection characteristic of a combination of the linear spring and the magnetic spring includes a characteristic of being the constant load in a displacement range corresponding to a predetermined up-down movement range including the balanced point of the upper frame.

Preferably, a low-repulsion material is provided for at least either of portions where the upper frame and the lower frame come close to each other at a stroke end in an up-down movement direction.

Further, preferably, a low-repulsion material is provided at stroke ends in a relative movement direction between the cylinder and the piston.

Further, a multi-suspension mechanism of the present invention includes:

the suspension mechanism; and another suspension mechanism stacked on the suspension mechanism.

In this case, preferably, the other suspension mechanism is also constituted of the suspension mechanism.

Further, a damper of the present invention is a telescopic damper including a cylinder and a piston which moves relatively in the cylinder, the cylinder has an outer stationary cylinder linked to one of controlled objects and an inner movable cylinder provided to be movable in the outer stationary cylinder, the piston is arranged in the inner movable cylinder and supported by a piston rod linked to the other of the controlled objects, around an outer peripheral surface of the piston, a linear member which exhibits friction damping force between the inner movable cylinder and the piston is wound, and a viscous fluid is made to adhere to the linear member, the linear member has a function in which tension is changed according to the relative movement, thereby changing friction damping force between the linear member and the inner movable cylinder and viscous damping force of the viscous fluid, and a predetermined damping force is exhibited in a case where the inner movable cylinder does not move relatively in the outer stationary cylinder and the piston moves relatively in the inner movable cylinder.

Preferably, the inner movable cylinder is longer in axial-direction length than the piston, and the inner movable cylinder moves relatively with the piston in the outer stationary cylinder until each end portion thereof abuts on either of a stopper portion on one end side and a stopper portion on the other side of the outer stationary cylinder, and after abutting on either of the stopper portions, when the piston moves relatively in the inner movable cylinder, the predetermined damping force acts.

Further, preferably, a low-repulsion material is provided at stroke ends in a relative movement direction between the cylinder and the piston.

Effect of the Invention

According to the suspension mechanism of the present invention, the plurality of dampers are suspended in parallel between the upper frame and the lower frame with the mounting angles different from each other. For this reason, the smaller mounting angle the damper has, the smaller a vertical component of damping force becomes, and the damping force which acts on the upper frame and the lower frame which move up and down relatively is moderate in effectiveness as compared with a case of disposing all the dampers at the same mounting angle. As a result, using the plurality of dampers suppresses a sense of incongruity in which strong damping force acts abruptly, improves a vibration absorption characteristic and an impact absorption characteristic, and leads to improvement in ride comfort, as in the case of disposing the plurality of dampers at the same mounting angle, in spite of having a structure which allows higher damping force to be exhibited than a case of disposing one damper.

Further, in the damper of the present invention suitable for the aforesaid suspension mechanism, the moving zone of the piston in the cylinder corresponding to a predetermined up-down movement range including the balanced point when the upper frame being one of controlled objects moves up and down relative to the lower frame being the other of the controlled objects is the free running zone where the damping force does not act. This prevents the damping force from acting on a predetermined input vibration and makes it possible to make the most of the vibration absorption characteristic caused by the spring mechanism in the vicinity of the balanced point.

Further, depending on a combination of the mounting angles of the dampers in the suspension mechanism and an adjustment of distances of the free running zones in the dampers, the vibration absorption characteristic and the impact absorption characteristic capable of responding to various kinds of input vibration can be exhibited. That allows the suspension mechanism or the multi-suspension mechanism of the present invention to have a structure corresponding to various input spectral classes demanded for the earth-moving machines, for example.

MODES FOR CARRYING OUT THE INVENTION

Figure 1:
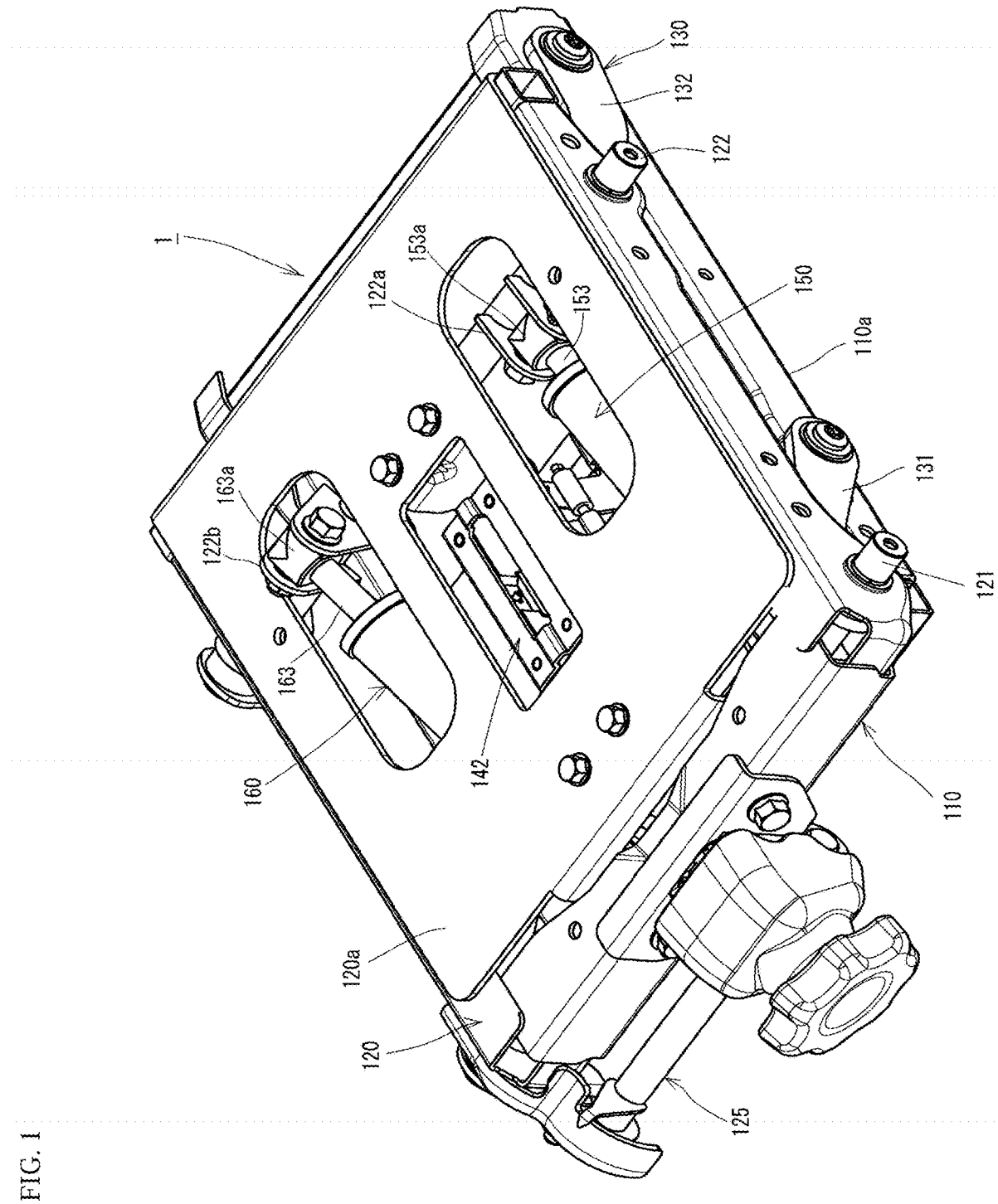
FIG. 1 is a perspective view illustrating a suspension mechanism according to one embodiment of the present invention.

The present invention will be hereinafter described in more detail based on embodiments illustrated in the drawings. FIG. 1 to FIG. 5 are views illustrating a suspension mechanism 1 according to this embodiment, and FIG. 6 illustrates an example of applying the suspension mechanism 1 to support for a seat 1000 for vehicles such as a passenger car, a truck, a bus, and a forklift. Note that in the seat 1000, a seat suspension unit 2000 is built in a lower portion of a seat cushion part 1100, and the seat suspension unit 2000 of the seat 1000 is linked and supported by an upper portion of the suspension mechanism 1 of this embodiment.

The suspension mechanism 1 has a substantially square frame-shaped upper frame 120 supported to be movable up and down through a link mechanism 130 relative to a lower frame 110 fixed to a vehicle body floor on the vehicle body structure side. Note that as in this embodiment, an upper surface of the substantially square frame-shaped upper frame 120 can also be covered by an upper plate 120*a*. The link mechanism 130 has a pair of left and right front links 131, 131 and a pair of left and right rear links 132, 132. In the front links 131, 131, lower portions 131*a*, 131*a* are supported rotatably at a position close to the front portion of side edge portions 110*a* of the lower frame 110, and upper portions 131*b*, 131*b* are linked to a front frame 121 of the upper frame 120. In the rear links 132, 132, lower portions 132*a*, 132*a* are supported rotatably at a position close to the rear portion of the side edge portions 110*a* of the lower frame 110, and upper portions 132*b*, 132*b* are linked to a rear frame 122 of the upper frame 120. With this structure, the upper frame 120 is movable up and down relative to the lower frame 110, more accurately, since the link mechanism 130 is constituted by the parallel link structure including the front links 131, 131 and the rear links 132, 132, the upper frame 120 moves up and down along a rotation trajectory of the front links 131, 131 and the rear links 132, 132. That is, with the displacement along rotational directions of the front links 131, 131 and the rear links 132, 132 having the lower portions 131*a*, 131*a*, 132*a*, 132*a* as rotation centers, that is, along a direction in which the front links 131, 131 and the rear links 132, 132 fall forward to go toward a lower limit position (a counterclockwise direction in FIG. 3) and a direction in which they return to the opposite of the above direction to go toward an upper limit position (a clockwise direction in FIG. 3), the upper frame 120 moves up and down.

Figure 5:
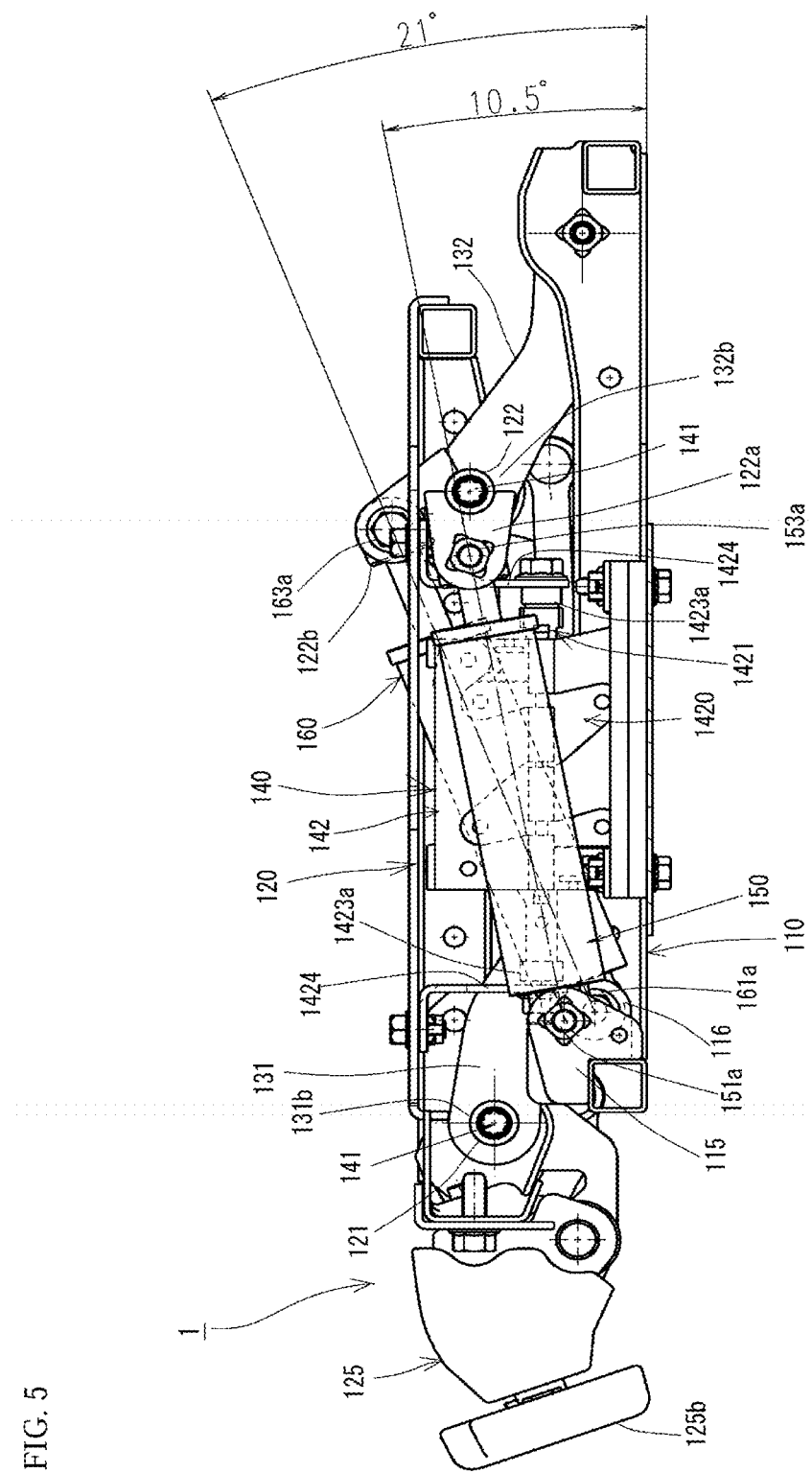
FIG. 5 is an arrow view taken along a line A-A of FIG. 2.
Figure 6:
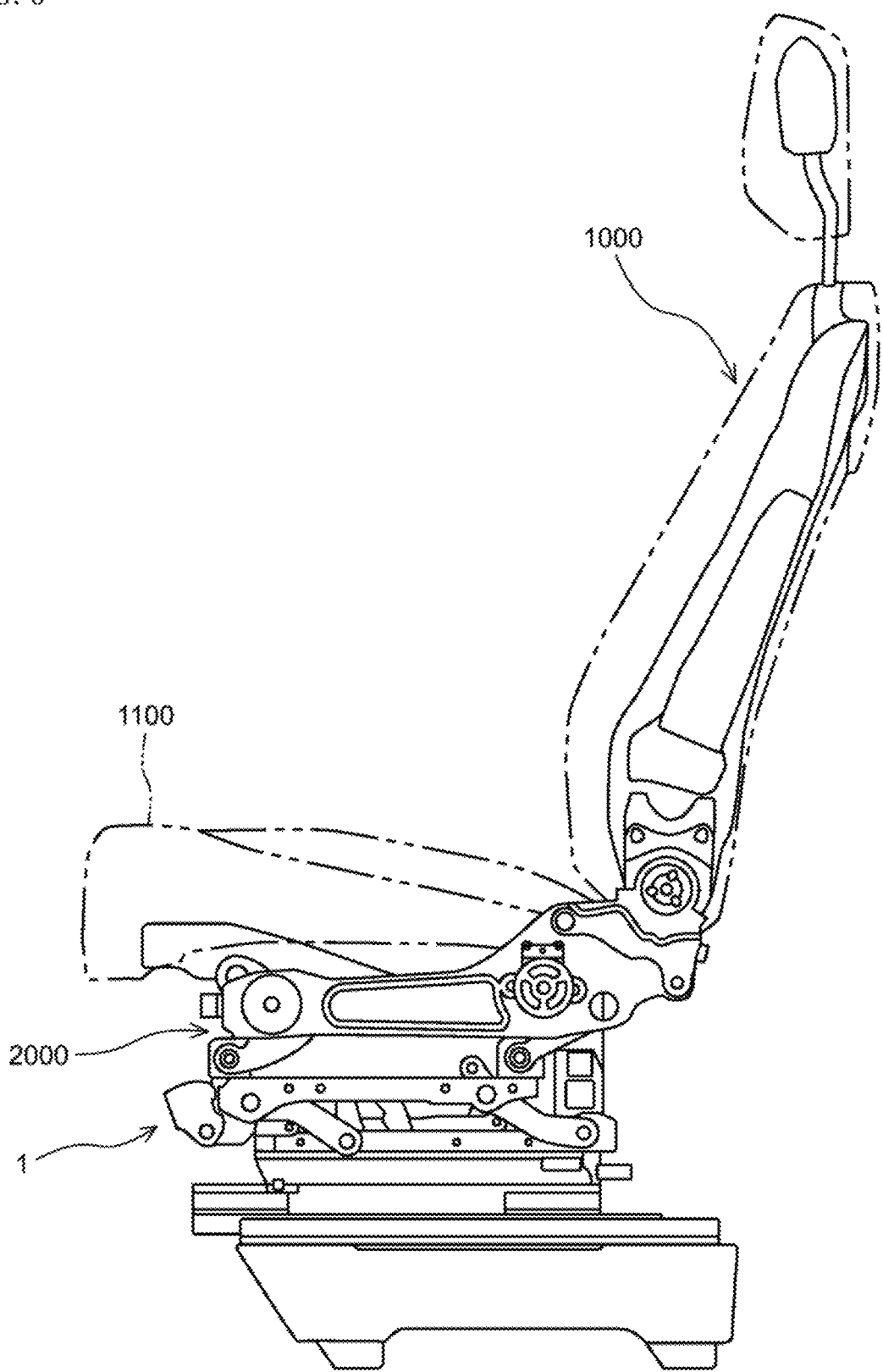
FIG. 6 is a view illustrating a seat structure including the aforesaid suspension mechanism and a seat supported by the suspension mechanism.

The front frame 121 and the rear frame 122 constituting the substantially square frame-shaped upper frame 120 are each formed of a pipe member in this embodiment, and torsion bars 141, 141 are inserted to the front frame 121 and the rear frame 122 respectively (refer to FIG. 5). In this embodiment, the torsion bars 141, 141 are linear springs which exhibit a linear characteristic in which their load-deflection characteristic changes approximately linearly (refer to FIG. 7), and are combined with a later-described magnetic spring 142 to constitute a spring mechanism 140 having a characteristic of being a constant load in a predetermined displacement range. The torsion bars 141, 141 are provided such that their one-side ends do not rotate relative to the front frame 121 and the rear frame 122 respectively, and the torsion bars 141, 141 are set so as to exhibit elastic force which biases the upper frame 120 in a direction in which the upper frame 120 is relatively separated from the lower frame 110, that is, in an upward direction. The other ends of the torsion bars 141, 141 are connected to plate members 125c, 125d of an elastic force adjusting member 125 respectively (refer to FIG. 2).

The elastic force adjusting member 125 is configured such that the rotation of its adjustment dial 125b causes the rotation of its adjustment shaft 125a, and this rotation causes the rotation of the plate member 125c connected to the front links 131, 131-side torsion bar 141 and then causes the rotation of the plate member 125d connected to the rear links 132, 132 side-torsion bar 141 linked to the plate member 125c through a link plate 125e. Therefore, when the adjustment dial 125b is operated to rotate, the torsion bars 141, 141 are twisted in either direction, so that initial elastic force of the torsion bars 141, 141 is adjusted, and depending on the weight of a seated person, it is possible to adjust the position of the upper frame 120 to a predetermined position in the up-down direction (for example, a neutral position).

Note that as the linear springs which bias the upper frame 120 in the direction in which the upper frame 120 is relatively separated from the lower frame 110, the torsion bars 141, 141 are preferable. The torsion bars 141, 141 themselves are each centered on a rotary shaft to be twisted, thereby exhibiting a predetermined spring force, but in a case of using a coil spring or the like, friction is produced on a portion where the coil spring is suspended and supported. This mainly causes high friction damping in the suspension mechanism 1.

Figure 2:
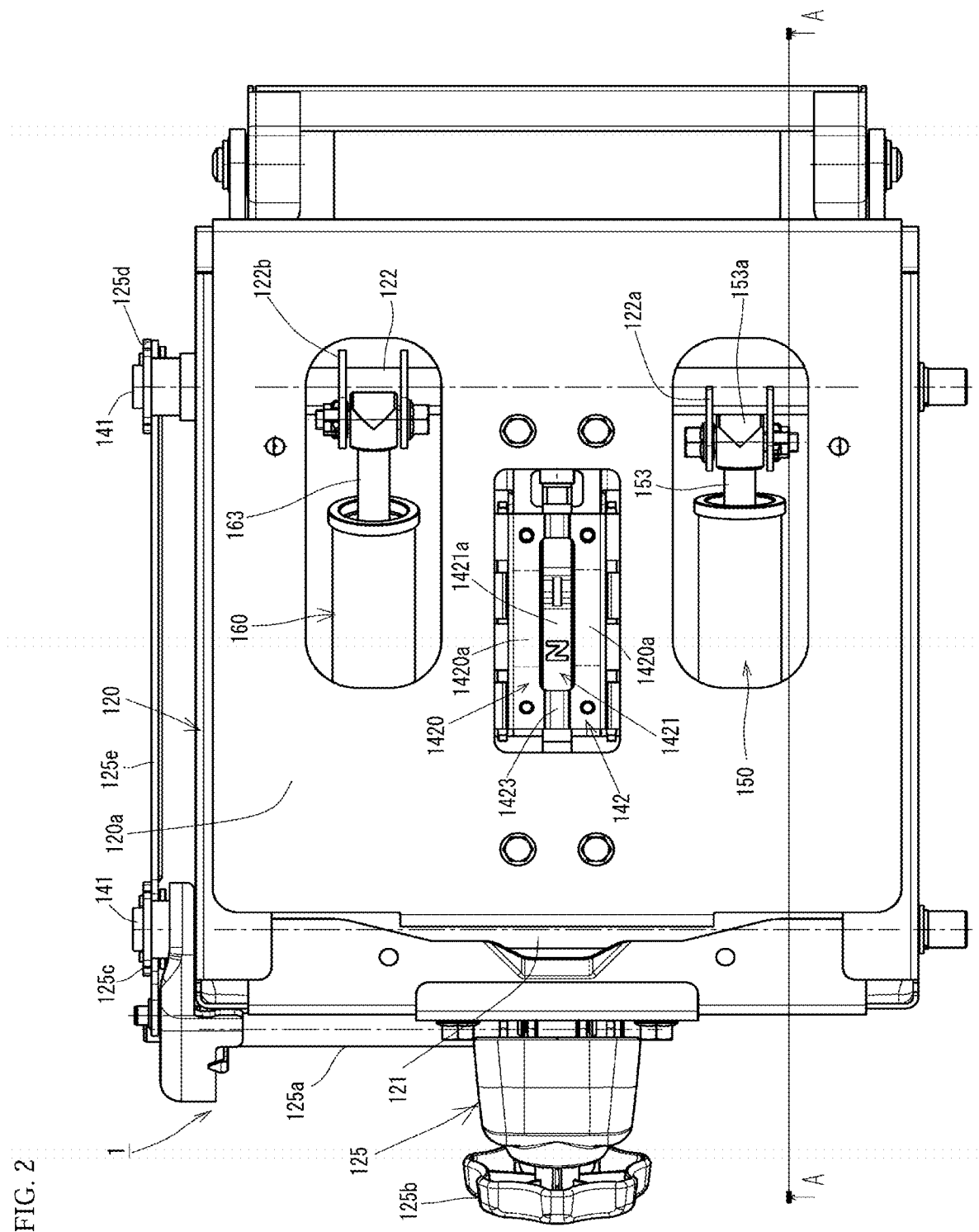
FIG. 2 is a plane view of FIG. 1.
Figure 3:
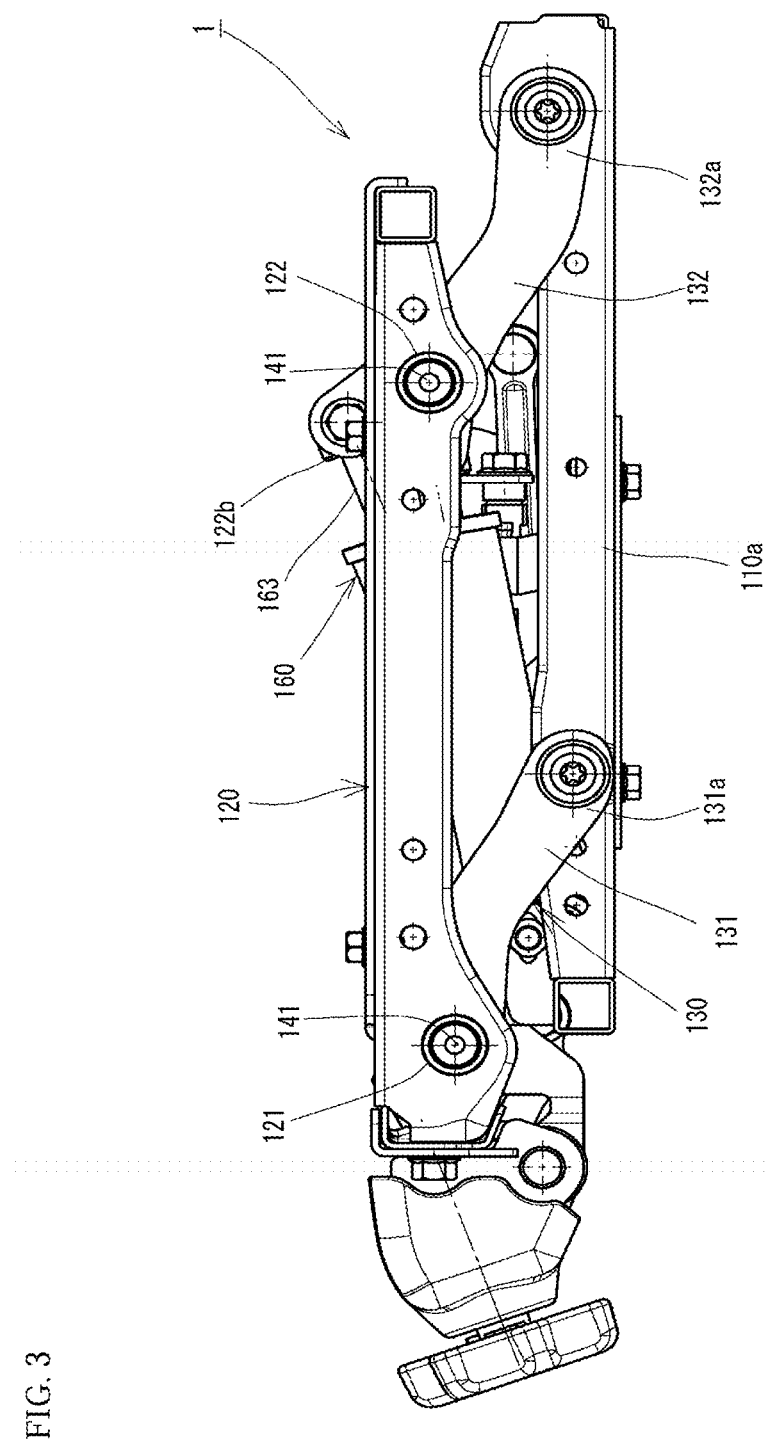
FIG. 3 is a side view of FIG. 1.

The magnetic spring 142 includes a stationary magnet unit 1420 and a movable magnet unit 1421 as illustrated in FIG. 2 and FIG. 5. The stationary magnet unit 1420 is fixed to the lower frame 110, and has a pair of stationary magnets 1420a, 1420a arranged while facing each other at a predetermined interval in a width direction of the lower frame 110. The facing stationary magnets 1420a, 1420a are arranged so that double-pole magnets whose different poles are adjacent to each other in a vertical direction are used and the same poles face each other. The movable magnet unit 1421 includes a movable magnet 1421a disposed in a space between the stationary magnets 1420a, 1420a which are disposed to face each other at the predetermined interval. The movable magnet 1421a is magnetized in the vertical direction, and supported by a support frame 1423, and support pieces 1423a, 1423a extending in front and rear of the support frame 1423 are linked to brackets 1424 fixed to the upper frame 120 and extending downward. For this reason, when the upper frame 120 moves up and down relative to the lower frame 110, the movable magnet 1421a supported by the support frame 1423 is displaced up and down in the space between the stationary magnets 1420a, 1420a.

Figure 7:
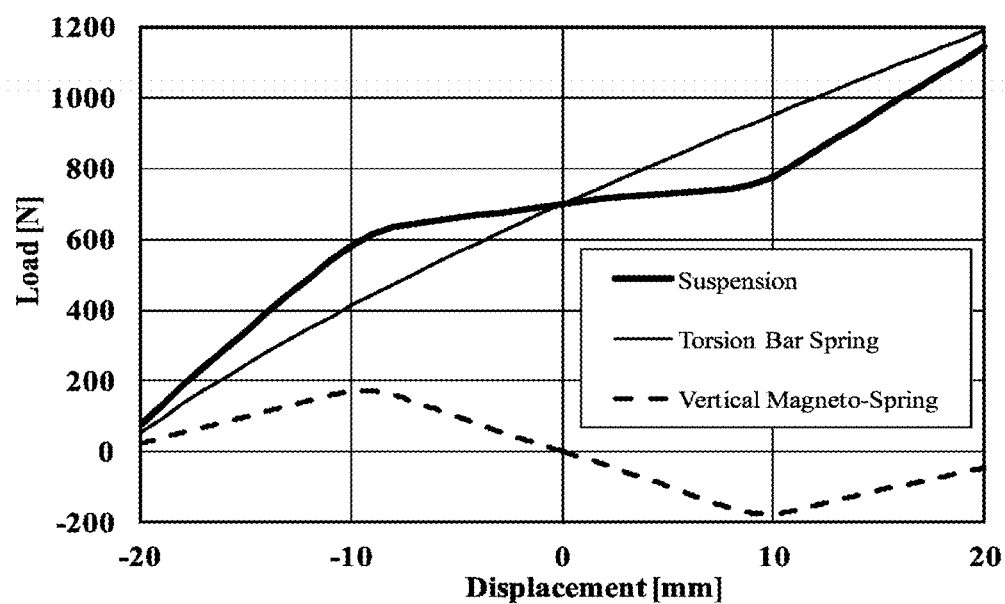
FIG. 7 is a chart illustrating an example of load-deflection characteristics of torsion bars, a magnetic spring and a spring mechanism including them.

The spring characteristic that the magnetic spring 142 exhibits when the movable magnet 1421a moves in the space between the stationary magnets 1420a, 1420a changes depending on a relative position of the movable magnet 1421a and the stationary magnets 1420a, 1420a. Specifically, as illustrated in FIG. 7, if a characteristic that restoring force increases in a working direction of the elastic force (restoring force) of the torsion bars 141, 141 which are the linear springs, that is, in such a direction as to cause the upper frame 120 to separate from the lower frame 110 is referred to as a positive spring characteristic, the magnetic spring 142 exhibits, in its load-deflection characteristic, a negative spring characteristic that the restoring force in this direction reduces in a predetermined displacement amount range (a characteristic indicated with a dotted line in the chart). That is, the negative spring characteristic is exhibited in a predetermined range in the vicinity of a position where the movable magnet 1421a crosses a boundary of the N pole and the S pole of the two stationary magnets 1420a, 1420a whose different poles are adjacent to each other (a range from about −9 mm to about +10 mm in an example in FIG. 7).

As a result, in the spring mechanism 140 of this embodiment including the magnetic spring 142 and the aforesaid torsion bars 141, 141, by adjusting a spring constant of the positive spring characteristic of the torsion bars 141, 141 (positive spring constant) and a spring constant of the magnetic spring 142 in the negative spring characteristic range (negative spring constant) to substantially equal values in the range where the negative spring characteristic acts in the magnetic spring 142 (the range from about −9 mm to about +10 mm in the example in FIG. 7), the whole spring mechanism 140 in which both the spring constants are superposed has a constant load region where a change amount of a load value is equal to or less than a predetermined amount even if the displacement amount increases, that is, a region where the spring constant is substantially zero (preferably a spring constant within a range of about −10 N/mm to about 10 N/mm). In order to use this region where the spring constant is substantially zero as effectively as possible, the movable magnet 1421a of the movable magnet unit 1421 is preferably set such that its middle position is substantially at the same position as the boundary of the two stationary magnets 1420a, 1420a whose different poles are adjacent to each other, when the upper frame 120 is at the neutral position of the stroke in the up-down direction.

Note that, in this embodiment, the magnetic spring 142 is placed in a posture in which the movable magnet 1421a moves in a substantially vertical direction between the stationary magnets 1420a, 1420a (vertical placement), but by linking the support frame 1423 of the movable magnet 1421a to the upper frame 120 through a link mechanism (not illustrated), the movable magnet 1421a and the stationary magnets 1420a, 1420a can also be configured to be placed substantially horizontally (horizontal placement). In a case of the horizontal placement, the link mechanism (not illustrated) becomes necessary, which causes a change in efficiency or the friction damping in accordance with a movement of the link mechanism, but in a case of the vertical placement, its influence is reduced. However, in the case of the horizontal placement, there is an advantage that the magnetic spring 142 can be formed to be thin, and in consideration of a stroke necessary for the upper frame 120 or a difference in characteristics between both the placements, an appropriate selection is possible.

Figure 8:
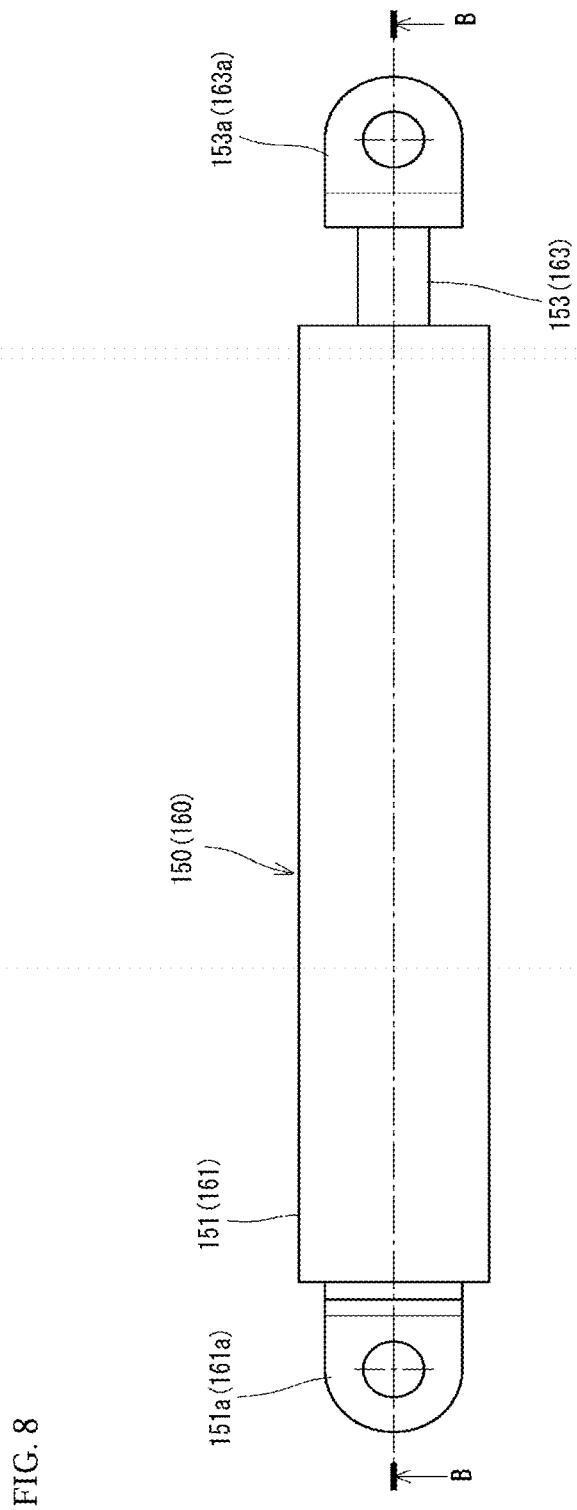
FIG. 8 is a view illustrating an external appearance of an example of a damper of the present invention used as first and second dampers.
Figure 9:
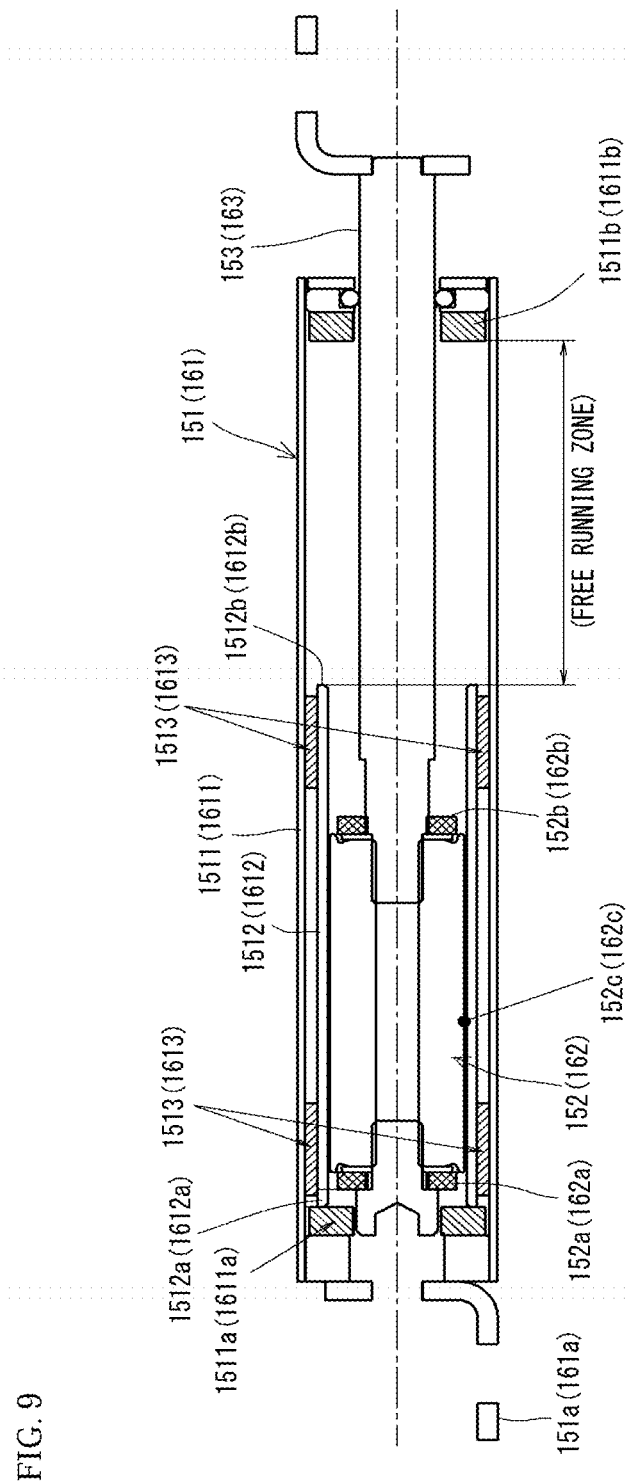
FIG. 9 is an arrow view taken along a line B-B of FIG. 8.

Between the lower frame 110 and the upper frame 120, a damper which exhibits the damping force to absorb energy when both move up and down relatively is provided in plurality. In this embodiment, two of a first damper 150 and a second damper 160 are arranged. Both of the first damper 150 and the second damper 160 are telescopic ones including cylinders 151, 161 and pistons 152, 162 which move relatively in the cylinders 151, 161 as illustrated in FIG. 8 and FIG. 9. Further, the first damper 150 and the second damper 160 are arranged to be right and left parallel to each other while sandwiching the aforesaid magnetic spring 142, and suspended at different mounting angles between the lower frame 110 and the upper frame 120 being the controlled objects, as illustrated in FIG. 1, FIG. 2 and FIG. 5. In this embodiment, as illustrated in FIG. 5, at the neutral position in the up-down direction of the upper frame 120, the first damper 150 is mounted at a mounting angle of about 10 degrees (10.5 degrees in FIG. 5), and the second damper 160 is mounted at a mounting angle of about 20 degrees (21 degrees in FIG. 5). By making the mounting angles different from each other, the smaller mounting angle the damper has, the smaller a vertical component of the damping force becomes, and the damping force which acts on the upper frame 120 and the lower frame 110 is moderate in effectiveness as compared with a case of disposing all the dampers at the same mounting angle.

Figure 4:
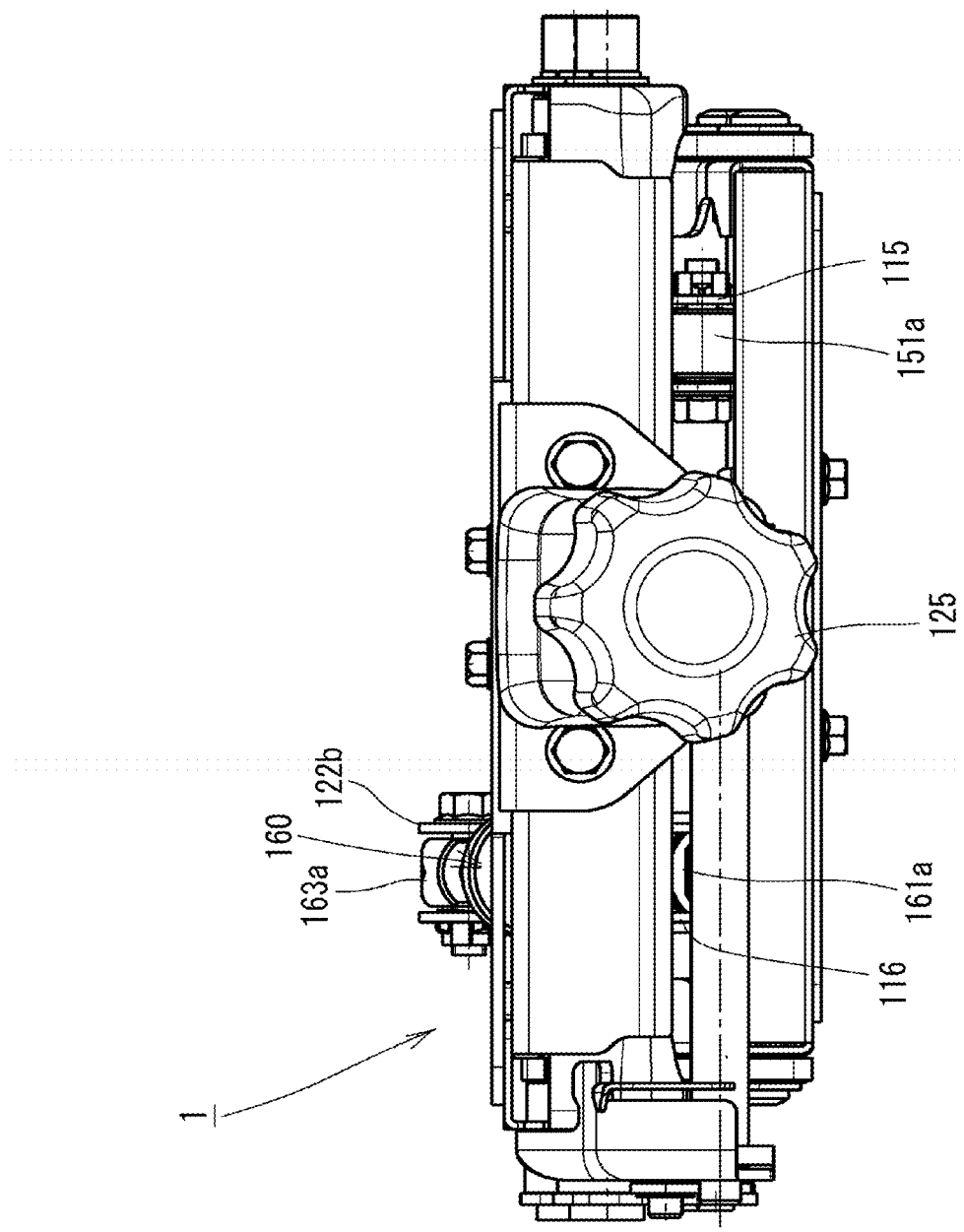
FIG. 4 is a front view of FIG. 1.

Specifically, first, closely to one side portion in the lower frame 110 while sandwiching the magnetic spring 142 therein, a first lower bracket 115 is provided in a bottom portion close to the front portion of this lower frame 110, and at a position closer to an upper portion than the bottom portion of the lower frame 110 in the first lower bracket 115, a rear end portion 151a of the cylinder 151 of the first damper 150 is pivotally supported (refer to FIG. 4 and FIG. 5). Further, on the rear frame 122 of the upper frame 120, a first upper bracket 122a is provided to substantially horizontally project forward of the rear frame 122, and by the first upper bracket 122a, a tip end portion 153a of the piston rod 153 linked to the piston 152 which moves relatively in the cylinder 151 and protruding from an open end of the cylinder 151 is pivotally supported (refer to FIG. 1, FIG. 2 and FIG. 5).

On one hand, closely to the other side portion in the lower frame 110 while sandwiching the magnetic spring 142 therein, a second lower bracket 116 is provided in a bottom portion close to the front portion of this lower frame 110, and at a position closer to the bottom portion of the lower frame 110 in the second lower bracket 116, a rear end portion 161a of the cylinder 161 of the second damper 160 is pivotally supported (refer to FIG. 4 and FIG. 5). Further, on the rear frame 122 of the upper frame 120, a second upper bracket 122b projecting obliquely upward forward of the rear frame 122 is provided, and by the second upper bracket 122b, a tip end portion 163a of the piston rod 163 linked to the piston 162 which moves relatively in the cylinder 161 and protruding from an open end of the cylinder 161 is pivotally supported (refer to FIG. 1 to FIG. 5).

Thus, making mounting heights of the rear end portions 151a, 161a of the cylinders 151, 161 of the first damper 150 and the second damper 160 in the lower frame 110 different from each other and making mounting heights of the tip end portions 153a, 163a of the piston rods 153, 163 in the upper frame 120 different from each other make the mounting angle of the first damper 150 relatively small and the mounting angle of the second damper 160 relatively large.

Here, in at least one of the dampers (the first damper 150 and the second damper 160 in this embodiment) disposed in plurality, a moving zone of the pistons 152, 162 in the cylinders 151, 161 corresponding to a predetermined up-down movement range including a balanced point when the upper frame 120 moves up and down relative to the lower frame 110 (which is a position in being seated in a stationary state, but a position aligned with a neutral position of the upper frame 120 as much as possible by an adjustment by using the aforesaid elastic force adjusting member 125) is preferably set to be a free running zone where the damping force does not act. In this embodiment, the free running zones are set in both of the first damper 150 and the second damper 160, and the free running zones are more preferably set in all the dampers as in this embodiment.

The first and second dampers 150, 160 of this embodiment having such free running zones take on a dual cylinder structure in which the cylinders 151, 161 include outer stationary cylinders 1511, 1611 and inner movable cylinders 1512, 1612 disposed in the inside thereof as illustrated in FIG. 9. The pistons 152, 162 are arranged to be slidable in the inner movable cylinders 1512, 1612. Stopper portions 1511a, 1611a, 1511b, 1611b are provided at long-side-direction end portions of the outer stationary cylinders 1511, 1611, and the inner movable cylinders 1512, 1612 are shorter in axial-direction length than the outer stationary cylinders 1511, 1611, and can move until end portions 1512a, 1612a, 1512b, 1612b in the long-side direction of the inner movable cylinders 1512, 1612 abut on the stopper portions 1511a, 1611a, 1511b, 1611b. The pistons 152, 162 are also similar, and can move until their end portions 152a, 162a, 152b, 162b in the long-side direction abut on the stopper portions 1511a, 1611a, 1511b, 1611b. In the axial-direction length, the inner movable cylinders 1512, 1612 are longer than the pistons 152, 162, and the piston rods 153, 163 are linked to the pistons 152, 162.

The pistons 152, 162 are provided with string portions 152c, 162c formed by winding a linear member such as a thread which exhibits a predetermined friction damping force between the inner movable cylinders 1512, 1612 and the pistons 152, 162, around their outer peripheral portions. In this embodiment, a viscous fluid such as grease having low consistency is made to adhere to the string portions 152c, 162c. The viscous fluid can be made to adhere to the linear member such as the thread composing the string portions 152c, 162c by impregnation or coating. Accordingly, when the pistons 152, 162 move relative to the inner movable cylinders 1512, 1612, the friction damping force caused by tension of the linear member composing the string portions 152c, 162c and viscous damping force of speed dependence caused by the viscous fluid act. That is, by a relative displacement of the pistons 152, 162 to the inner movable cylinders 1512, 1612, friction force between both is converted to the tension of the string portions 152c, 162c, and in accordance with an increase in the displacement amount, the thread composing the string portions 152c, 162c is hardened integrally to change to a direction of reducing a friction coefficient, thereby suppressing heat generation. This change causes the viscous damping force to be a speed dependence type. Therefore, the action of the friction damping force becomes relatively large in an input at low speed, but the viscous damping force becomes higher as the speed increases. Note that depending on increase and decrease in the number of turns of the thread composing the string portions 152c, 162c, a gap between adjacent portions of the wound thread, the number of stacks of the wound thread, or the like, the friction force and the viscous damping force to be generated are appropriately controlled.

On one hand, between outer peripheral surfaces of the inner movable cylinders 1512, 1612 and inner peripheral surfaces of the outer stationary cylinders 1511, 1611, so as to make friction force between both relatively smaller than the friction force generated by the string portions 152c, 162c between the inner movable cylinders 1512, 1612 and the pistons 152, 162, in this embodiment, between the inner movable cylinders 1512, 1612 and the outer stationary cylinders 1511, 1611, low-friction members 1513, 1613 such as rolling members or sliding members (for example, felt) are interposed.

This makes the inner movable cylinders 1512, 1612 and the pistons 152, 162 move together in the outer stationary cylinders 1511, 1611, owing to a difference between the friction force between the inner movable cylinders 1512, 1612 and the pistons 152, 162, and, the friction force between the inner movable cylinders 1512, 1612 and the outer stationary cylinders 1511, 1611, until the end portions 1512a, 1612a, 1512b, 1612b of the inner movable cylinders 1512, 1612 abut on the stopper portions 1511a, 1611a, 1511b, 1611b, when the pistons 152, 162 move relatively in the cylinders 151, 161 while following movements of the piston rods 153, 163 linked to the upper frame 120 side as the controlled object. At this time, frictional resistance is very small between the inner movable cylinders 1512, 1612 and the outer stationary cylinders 1511, 1611 owing to the low-friction members 1513, 1613, and the inner movable cylinders 1512, 1612 substantially freely run in the outer stationary cylinders 1511, 1611 to generate little damping force. After the end portions 1512a, 1612a, 1512b, 1612b of the inner movable cylinders 1512, 1612 abut on any of the stopper portions 1511a, 1611a, 1511b, 1611b, because the inner movable cylinders 1512, 1612 are prevented from moving, the pistons 152, 162 slide in the inner movable cylinders 1512, 1612 alone. This makes such friction damping force and viscous damping force as described above act between the pistons 152, 162 and the inner movable cylinders 1512, 1612.

Accordingly, ranges where the inner movable cylinders 1512, 1612 of the cylinders 151, 161 move relatively in the outer stationary cylinders 1511, 1611 are free running zones where the damping force does not substantially act, and distances of the free running zones correspond to differences in the axial-direction length between the outer stationary cylinders 1511, 1611 and the inner movable cylinders 1512, 1612. As a result, in the predetermined up-down movement range including the balanced point, the moving zones where the pistons 152, 162 do not move relative to the inner movable cylinders 1512, 1612 and the damping force does not effectively work are formed. Preferably, at the balanced point in a seating state when the upper frame 120 moves up and down relative to the lower frame 110 (a position adjusted so as to be aligned with a neutral position of the entire stroke, in which the upper frame 120 can move up and down, as much as possible), the inner movable cylinders 1512, 1612 are set to be at a substantially middle position of the entire moving range in the outer stationary cylinders 1511, 1611. This causes a predetermined up-down movement range including the balanced point to be formed evenly in the upper and lower portions thereof with the balance point centered.

When the upper frame 120 is vibrated relatively by a vibration input during running, in a case where the action of the dampers 150, 160 corresponds to the aforesaid free running zones, the damping force does not substantially act, and the spring mechanism 140 mainly serves a vibration absorbing function, and in a case where a vibration with an amplitude at a low frequency equal to or larger than a predetermined amplitude is input, the damping force of the first damper 150 or the second damper 160 acts, which is useful for absorption of impact energy. At this time, making distances of the free running zones of the two dampers 150, 160 different from each other allows magnitude of the amplitude and a frequency on which the damping force begins to act to be varied. That is, depending on the amplitude and the frequency of an input vibration, only either of the dampers 150, 160 which make the damping force act can be used, or both of them can be used, which allows efficient vibration absorbing function and impact absorbing function to be exhibited against a vibration having a small amplitude and a high frequency and a vibration having a large amplitude and a low frequency. In this embodiment, since the mounting angle of the second damper 160 is larger than that of the first damper 150, the second damper 160 is preferably larger than the first damper 150 in the distance of the free running zone. This is because a larger displacement amount of the piston 162 and the inner movable cylinder 1612 of the second damper 160 at a larger mounting angle than a displacement amount of the piston 152 and the inner movable cylinder 1512 of the first damper 150 makes an influence of the damping force of the second damper 160 relatively large if the distances of both the free running zones are equal to each other.

As in the above, according to this embodiment, the suspension mechanism 1 has the plurality of dampers such as the first and second dampers 150, 160, while their mounting angles and free running zones are made different from each other. As described above, if the plurality of dampers are provided at the same mounting angle and both have the same distance of the free running zone, all of the timings at which the damping force of the plurality of dampers strongly acts are the same and the damping force against a large impact vibration acts abruptly strongly, resulting in that a seated person bears a large sense of incongruity. However, according to this embodiment, making both of the mounting angles and the distances of the free running zones different causes the damping force to moderately act, which prevents the seated person from feeling abrupt. At the same time, since the damping force of the plurality of dampers finally acts, sufficient impact absorbing power can be obtained.

Here, the pistons 152, 162 can move until abutting on the stopper portions 1511a, 1611a, 1511b, 1611b, and the stopper portions 1511a, 1611a, 1511b, 1611b disposed at stroke ends in the relative movement direction are preferably composed of a low-repulsion material. As the low-repulsion material, soft urethane foam, sponge, rubber, gel, or the like can be cited. By using these, a bottoming feeling at the stroke ends is suppressed. In this case, in place of the stopper portions 1511a, 1611a, 1511b, 1611b or with the stopper portions 1511a, 1611a, 1511b, 1611b, the low-repulsion material can also be provided on the pistons 152, 162 sides.

The low-repulsion material for suppressing the bottoming feeling can also be provided for at least either of portions where the upper frame 120 and the lower frame 110 come close to each other at the stroke end. For example, the low-repulsion material can be provided for at least either of an under surface of the upper plate 120a of the upper frame 120 and a portion facing the stationary magnet unit 1420 of the magnetic spring 142. Either of the low-repulsion material provided for the aforesaid dampers 150, 160 and the low-repulsion material provided between portions facing the upper frame 120 and the lower frame 110 may be provided, or both of them may be provided.

(Test Regarding Vibration Characteristic of Suspension Mechanism 1)

A subject was seated on the seat 1000 supported by the suspension mechanism 1 of this embodiment (refer to FIG. 6), and a SEAT value and a vibration transmissibility were found by carrying out a vibration test based on JIS A 8304:2001 (ISO 7096:2000). The vibration test was carried out using the input spectral classes EM6, EM7, EM8.

Further, as the subject when the SEAT value was found, in accordance with JIS A 8304:2001 (ISO 7096:2000), two of a subject with light weight (JM55=a weight of 55 kg) and a subject with heavy weight (JM98=a weight of 98 kg) were adopted, and in a main test, a subject with weight between them (JM67=a weight of 67 kg) was also further adopted, to evaluate a total of three subjects.

Incidentally, the input spectral class EM6 is a standard for "crawler tractor-dozer of 50,000 kg or less", in which after the excitation by a 7.6 Hz dominant frequency and a 0.34 $(m/s^2)^2$/Hz maximum value of PSD, a SEAT value is required to be less than 0.7 and a vibration transmissibility in a resonant frequency in a vertical axis direction is required to be less than 1.5. The input spectral class EM7 is a standard for "compact dumper", in which after the excitation by a 3.24 Hz dominant frequency and a 5.56 $(m/s^2)^2$/Hz maximum value of PSD, a SEAT value is required to be less than 0.6 and a vibration transmissibility in a resonant frequency in the vertical axis direction is required to be less than 2.0. The input spectral class EM8 is a standard for "compact loader of 4,500 kg or less", in which after the excitation by a 3.3 Hz dominant frequency and a 0.4 $(m/s^2)^2$/Hz maximum value of PSD, a SEAT value is required to be less than 0.8 and a vibration transmissibility in a resonant frequency in the vertical axis direction is required to be less than 2.0.

Further, in the suspension mechanism 1 used in the main test, a maximum stroke amount in the vertical direction (up-down direction) was 40 mm, and a vibration transmissibility was evaluated by using a weight of 75 kg and loading it with a sinusoidal sweep waveform in which the total amplitude of a displacement of a vibration table of a vibrator was set to 16 mm equal to 40% of a maximum stroke length.

In addition, the used vibrator was an electrokinetic-type triaxial vibrator (manufactured by IMV corp., a triaxial vibrator TAS-1000-5, a 60 mm maximum excitation stroke), and the test was carried out by setting the seat 1000 supported by the suspension mechanism 1 on its vibration table.

Further, in the seat 1000 supported by the suspension mechanism 1, as illustrated in FIG. 6, the seat suspension unit 2000 was built in a lower portion of the seat cushion part 1100, and a maximum stroke amount in the vertical direction of the seat suspension unit 2000 was 40 mm.

Further, as the suspension mechanisms 1, the following two kinds (A type, B type) of suspension mechanisms 1 in each of which the distances of the free running zones of the first damper 150 (a mounting angle of about 10 degrees (to be accurate, 10.5 degrees)) and the second damper 160 (a mounting angle of about 20 degrees (to be accurate, 21 degrees)) were made different from each other were prepared, and the seat 1000 was placed on each of them, to carry out the test.

(A-Type Suspension Mechanism 1)

a distance of a free running zone of the first damper 150: 5 mm a distance of a free running zone of the second damper 160: 10 mm (B-Type Suspension Mechanism 1)

a distance of a free running zone of the first damper 150: 5 mm a distance of a free running zone of the second damper 160: 15 mm Further, the first damper 150 and the second damper 160, for both of which as the string portions 152*c*, 162*c*, one in which a short fiber made of polyamide (PA6.6) and having a 0.9 dtex diameter and a 0.5 mm length is planted on a surface of a multifilament thread made of polyamide (PA6) and having a 470 dtex diameter is used, are configured to wind it densely in the first layer while being inclined about 85 degrees in one direction to the axial direction and wind it densely while being inclined about 85 degrees in the opposite direction so that the second layer crosses the first layer, around the outer peripheries of the pistons 152, 162. Further, on the string portions 152*c*, 162*c*, grease as the viscous fluid, specifically, a trade name: Valiant Grease R2 (Showa Shell Sekiyu K.K., a thickener: lithium soap, base oil: synthetic oil (dynamic viscosity (100° C.) of JIS K 2283: 19.3, penetration of JIS K 2220 236 (unworked), and worked (274)) is made to adhere using a spatula. Further, as the low-friction members 1513, 1613, felt was arranged.

Figure 10:
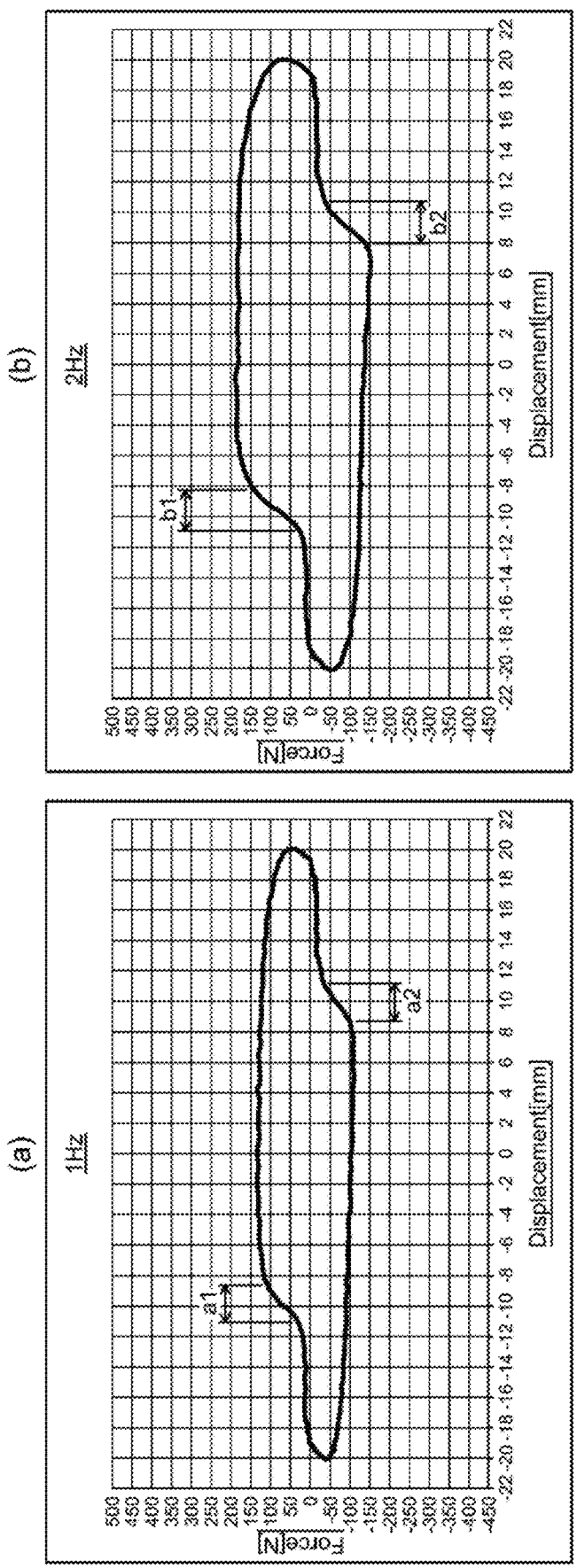
FIGS. 10(*a*), (*b*) are Lissajous figures illustrating an example of a characteristic of the damper.

As an example, by setting the second damper 160 in which the distance of the free running zone was set to 10 mm in a servo pulser (Shimadzu Corporation) and displacing the piston 162 relative to the cylinder 161, a vibration characteristic was examined. A vibration frequency was set to 1 Hz, 2 Hz, and the second damper 160 was vibrated at an amplitude of ±20 mm. The results are illustrated as Lissajous figures each representing a relationship between a displacement amount (horizontal axis) and a damping force (vertical axis) in FIGS. 10(*a*), (*b*). According to FIGS. 10(*a*), (*b*), in ranges of "−20 mm to −10 mm" and "+10 mm to +20 mm" each corresponding to the free running zone, since the inner movable cylinder 1612 moves relative to the outer stationary cylinder 1611, the damping force is hardly generated. In contrast to this, in a range of "−10 mm to +10 mm" other than the above, it is found that a predetermined damping force acts. At this time, even in cases of both of the frequencies, in the "vicinity of −10 mm" (ranges of a1, b1 in FIGS. 10(*a*), (*b*)) and the "vicinity of +10 mm" (ranges of a2, b2 in FIGS. 10(*a*), (*b*)), it is found that ranges each having oblique changes are present. This catches a start of movement of the piston 162 in the inner movable cylinder 1612, and at the start of movement, the tension of the string portion 162*c* indicates a gradual change, which achieves the action of relieving a shock when the damping force starts to effectively work. Further, when the ranges of a1, a2 at 1 Hz and the ranges of b1, b2 at 2 Hz are compared, an inclination angle is sharper at 2 Hz. This indicates that a deformation of the string portion 162*c* is gradual against small force, but a deformation thereof is rapid and reaction force also becomes large against larger force.

The results of the vibration test were as illustrated in the following table and FIG. 11 to FIG. 15.

TABLE 1

|  | | A type Subject | | | B type Subject | | |
| --- | --- | --- | --- | --- | --- | --- | --- |
|  | | JM55 | JM67 | JM98 | JM55 | JM67 | JM98 |
| EM6_SEAT Value | <0.7 | 0.583 | 0.547 | 0.545 | 0.612 | 0.580 | 0.511 |
| EM8_SEAT Value | <0.8 | 0.777 | 0.737 | 0.712 | 0.746 | 0.716 | 0.622 |
| Damping Test | Hz | | 1.1 | | | 3.0 | |
|  | Peak | | 1.073 | | | 1.350 | |

As described above, a vibration whose dominant frequency is in a high-frequency band of 7.6 Hz is used in EM6 and a vibration whose dominant frequency is in a low-frequency band of 3.3 Hz is used in EM8, and the evaluation by using their two test waveforms makes it possible to confirm vibration damping performance in a wide range of frequency bands. As is obvious from Table 1, even in cases of using both of the A-type and B-type suspension mechanisms 1, the standard of EM6 such as the SEAT value: less than 0.7, the vibration transmissibility in the resonant frequency in the vertical axis direction: less than 1.5 was satisfied, and the standard of EM8 such as the SEAT value: less than 0.8, the vibration transmissibility in the resonant frequency in the vertical axis direction: less than 2.0 was also satisfied. Consequently, it is found that the suspension mechanism 1 of this embodiment can exhibit high vibration damping performance in a wide range of frequency bands in both of the A type and the B type.

Figure 11:
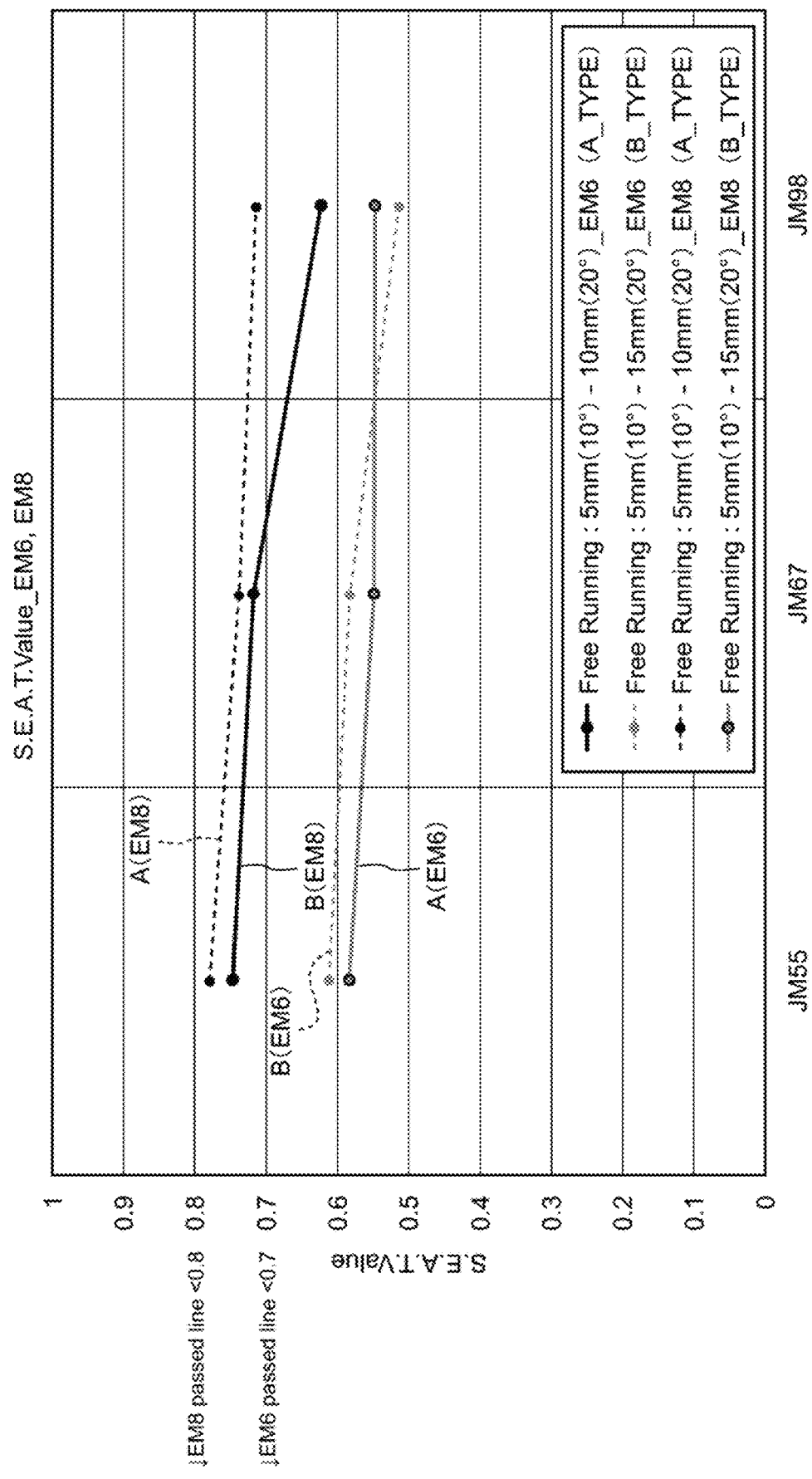
FIG. 11 is a chart illustrating results of SEAT values in vibration tests using EM6 and EM8.

In confirming the SEAT values in EM6 and EM8 in more detail, as illustrated in FIG. 11, in a case of JM55 where vibration suppressing action caused by mass is the smallest, regarding EM6 in which the high-frequency band is centered, the A type having a short distance of the free running zone of the second damper 160 obtained a better result, and regarding EM8 in which the low-frequency band is centered, the B type having a long distance of the free running zone of the second damper 160 obtained a better result.

Figure 12:
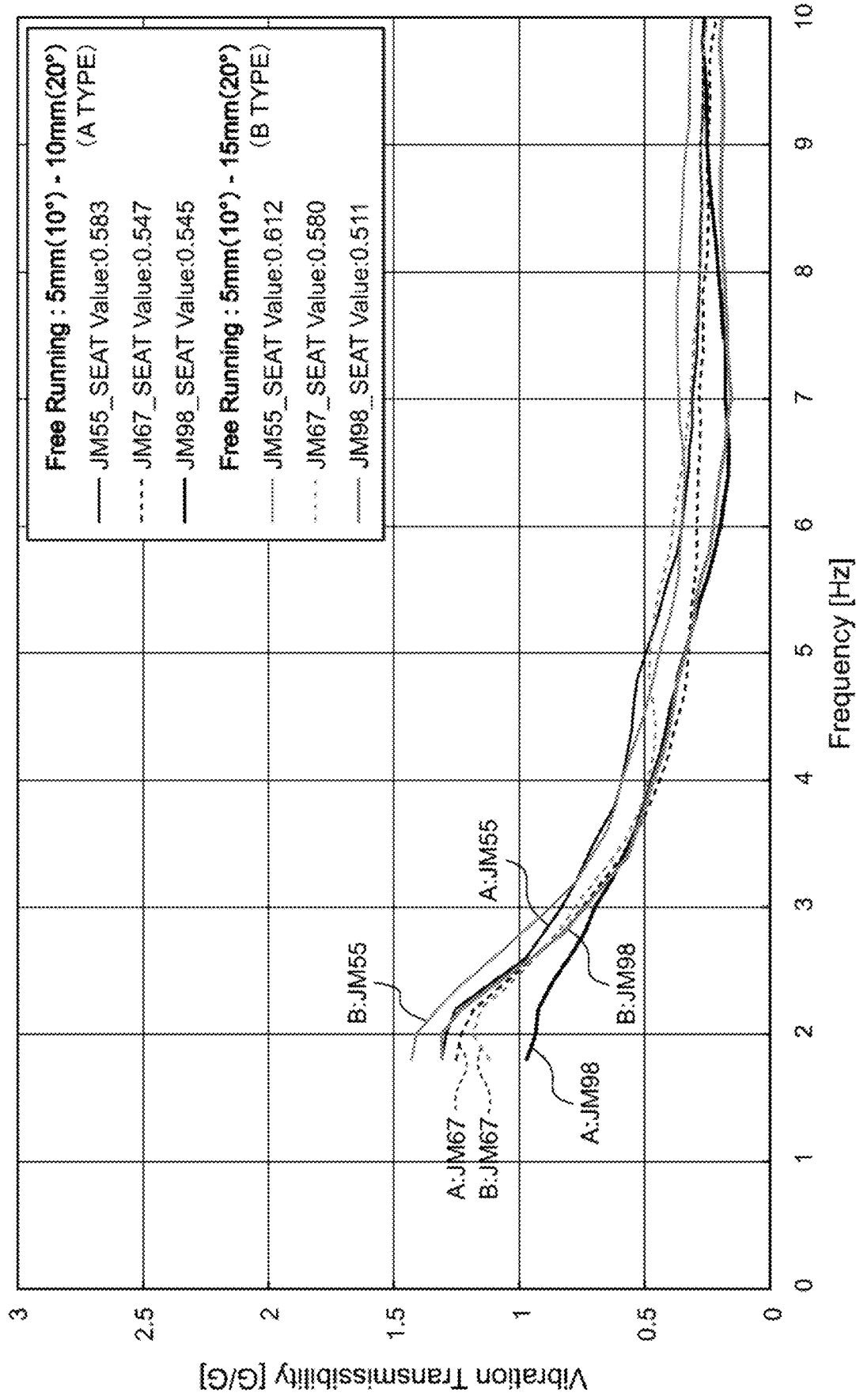
FIG. 12 is a chart illustrating vibration transmissibilities in a state where subjects are seated, obtained by using EM6.
Figure 13:
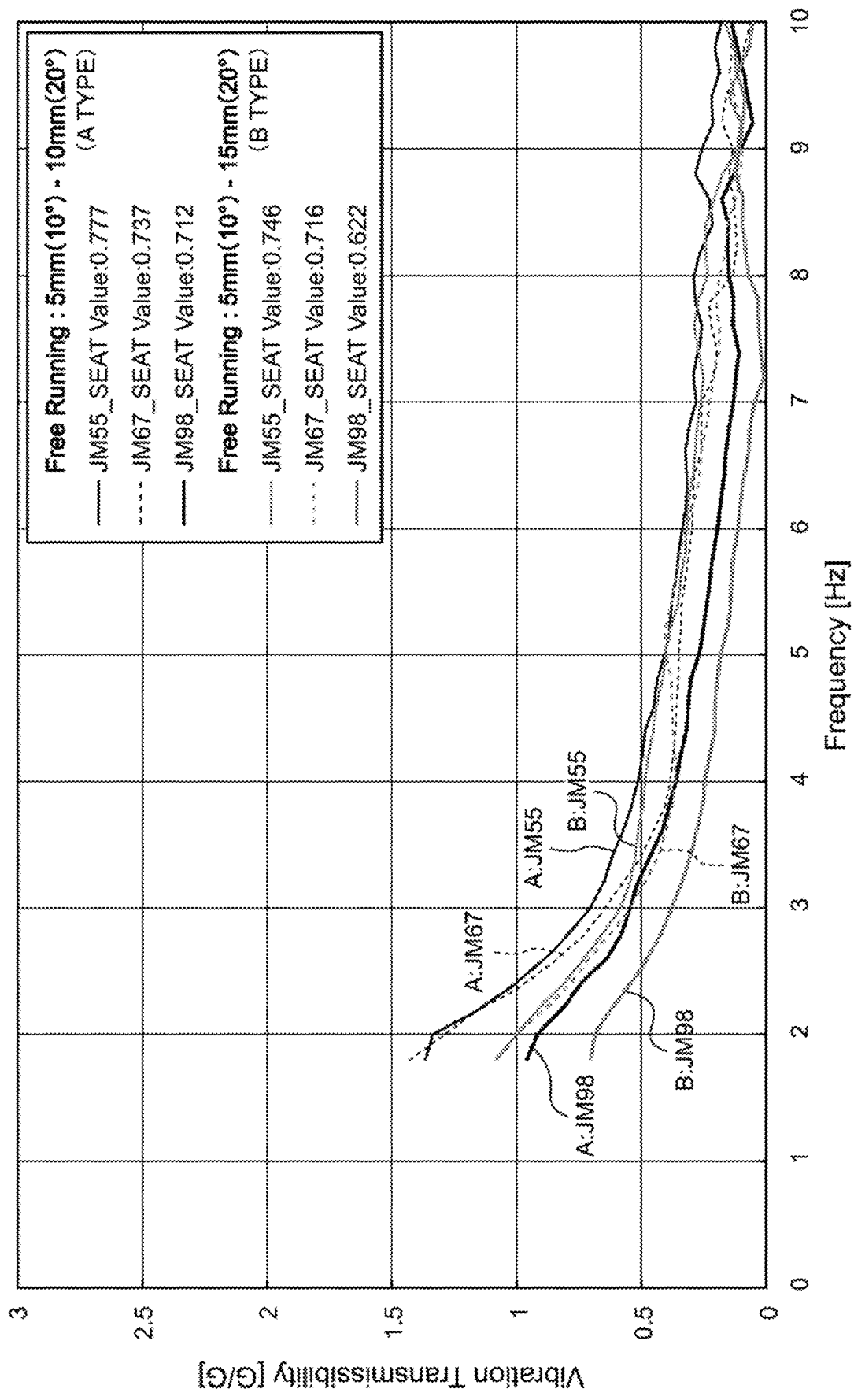
FIG. 13 is a chart illustrating vibration transmissibilities in the state where the subjects are seated, obtained by using EM8.

A similar tendency can be seen in this point even when the vibration transmissibility for each subject is observed. That is, in observing FIG. 12 illustrating the vibration transmissibilities in EM6 when the subjects were seated on the seat 1000, the vibration transmissibilities of the A type had a tendency to be lower than those of the B type, while in FIG. 13 illustrating the vibration transmissibilities in EM8 when the subjects were seated on the seat 1000, the vibration transmissibilities of the B type had a tendency to be lower than those of the A type.

Figure 14:
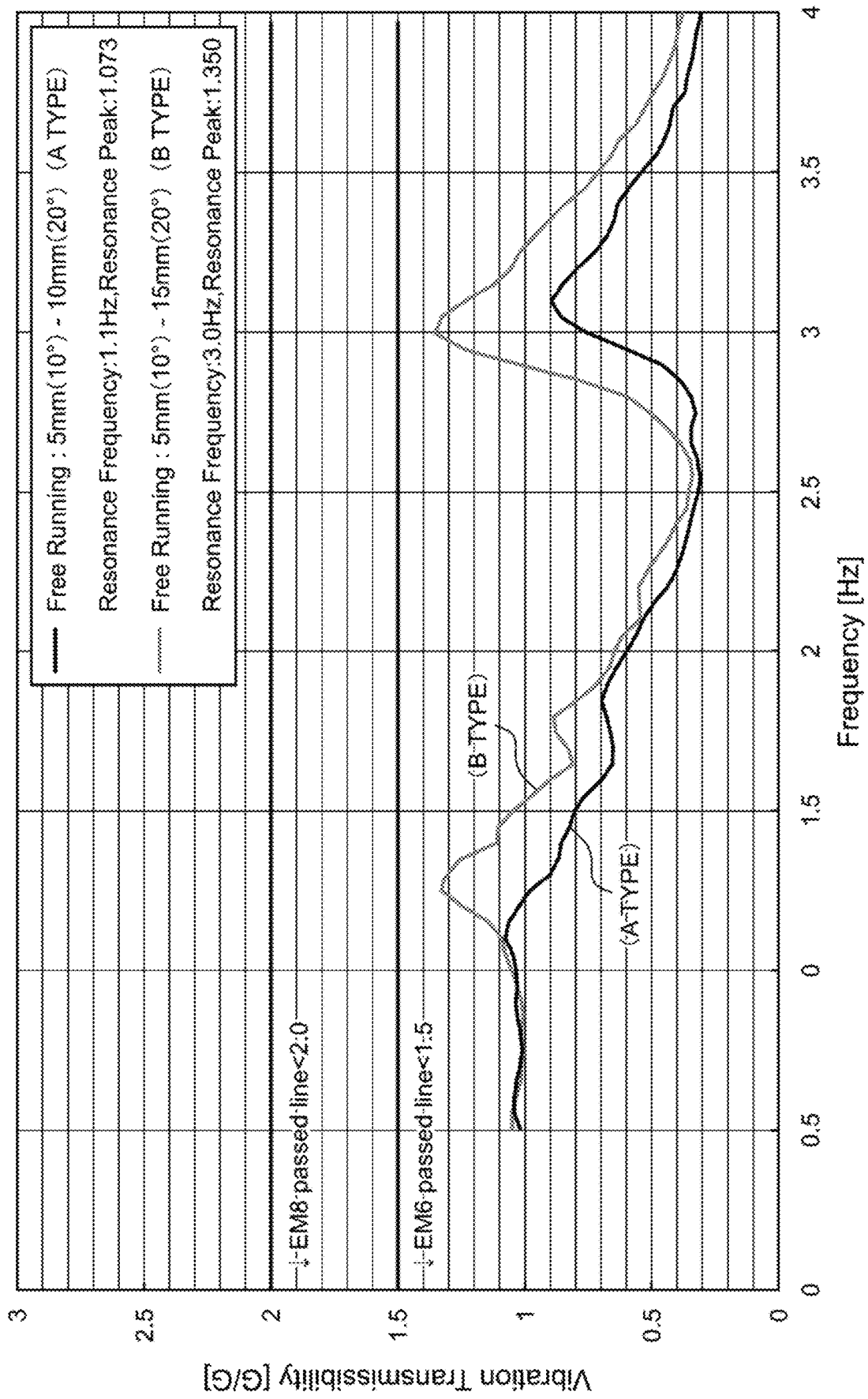
FIG. 14 is a chart illustrating test results of vibration transmissibilities measured after placing a rubber weight of 75 kg on the seat.

FIG. 14 illustrates test results of vibration transmissibilities measured after placing a rubber weight of 75 kg on the seat cushion part 1100 of the seat 1000. Note that the total amplitude of an input vibration is 16 mm as described above. Both of the A type and the B type satisfied the standards of both of EM6 and EM8, and a resonant frequency was 1.1 Hz in the A type, while a resonant frequency was 3.0 Hz in the B type. Thus, since there is a characteristic difference between the A type and the B type, it is preferable to select a more proper suspension mechanism 1 according to the input vibration through the vehicle body floor which is expected depending on a road surface, a use point, or the like.

Figure 15:
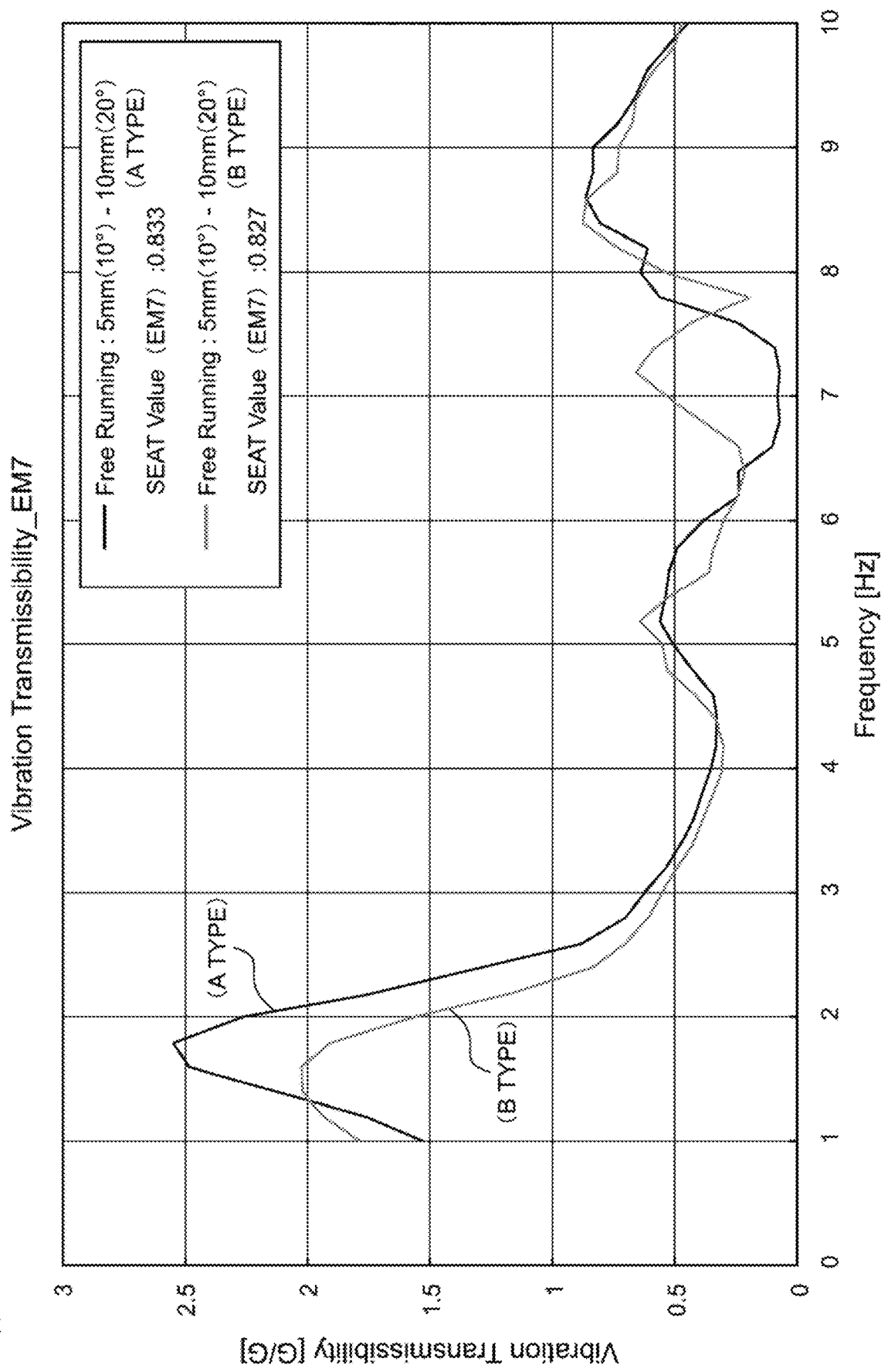
FIG. 15 is a chart illustrating vibration transmissibilities in a state where the subject is seated, obtained by using EM7.

FIG. 15 is a chart illustrating vibration transmissibilities in EM7 in the test carried out by seating the subject with JM67. A random wave in which 3 Hz is centered is used in the input spectral class EM7, and in a case of the A-type suspension mechanism 1, a resonant frequency was about 1.8 Hz, and a vibration transmissibility at this time was about 2.5, and in a case of the B-type suspension mechanism 1, a resonant frequency was about 1.6 Hz, and a vibration transmissibility at this time was about 2.0. In a case of EM7, in the low-frequency band, the B type indicated a tendency for the vibration transmissibility to be lower, and the A type indicated a tendency for the vibration transmissibility to be slightly lower in the high-frequency band of 6 Hz or more. Further, the SEAT value is 0.833 in the A type and it is 0.827 in the B type, and they slightly exceeded the standard.

Figure 16:
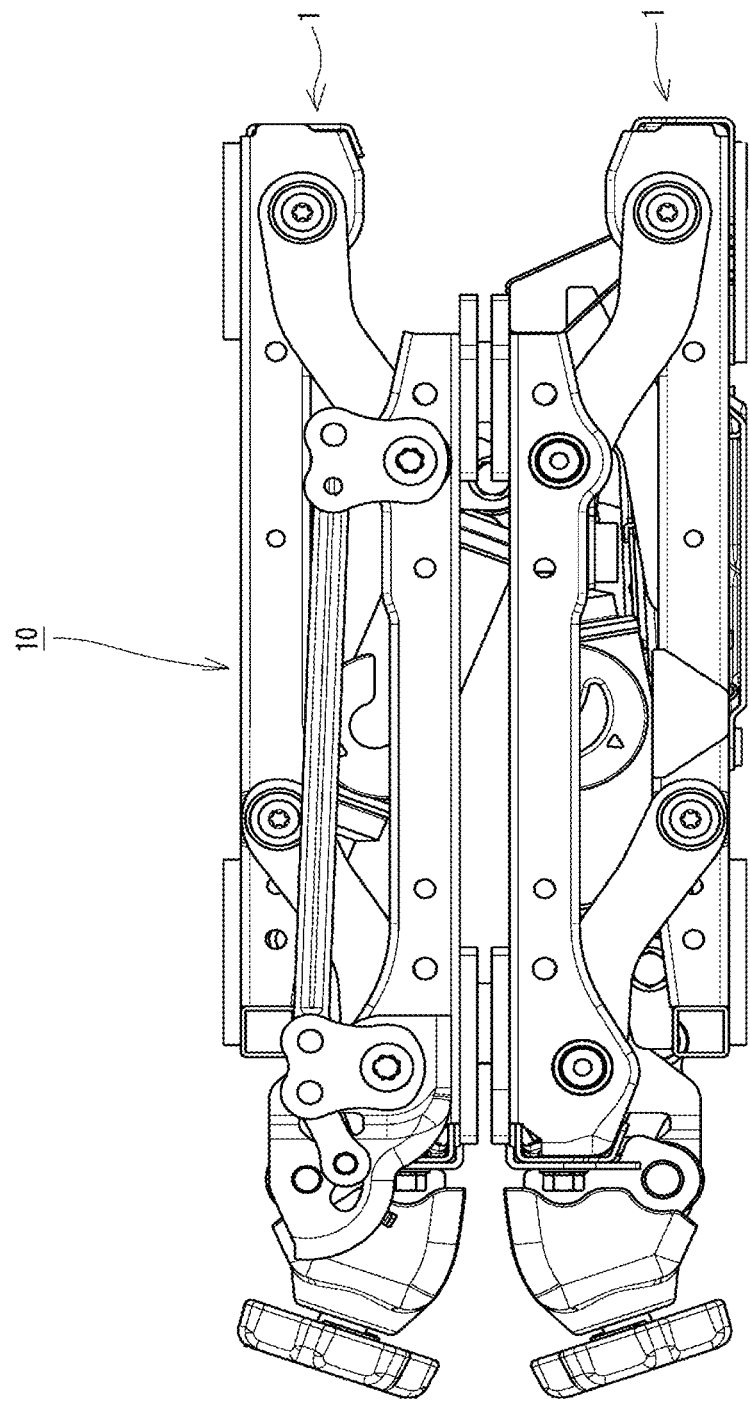
FIG. 16 is a view illustrating an example of a multi-suspension mechanism of the present invention.

Meanwhile, stacking a plurality of suspension mechanisms 1 creates a series of spring mechanisms, which makes the vibration transmissibility lower than that in a case of using one suspension mechanism. As described above, the suspension mechanism 1 of this embodiment satisfies the standards of EM6, EM8 even in a single body. On the other hand, the standard is exceeded regarding EM7, but the excess is very slight. Thus, for example, as illustrated in FIG. 16, a multi-suspension mechanism 10 in which the plurality of suspension mechanisms 1 are stacked makes a vibration transmissibility of a resonant frequency low and allows the standard of EM7 to be satisfied.

Figure 17:
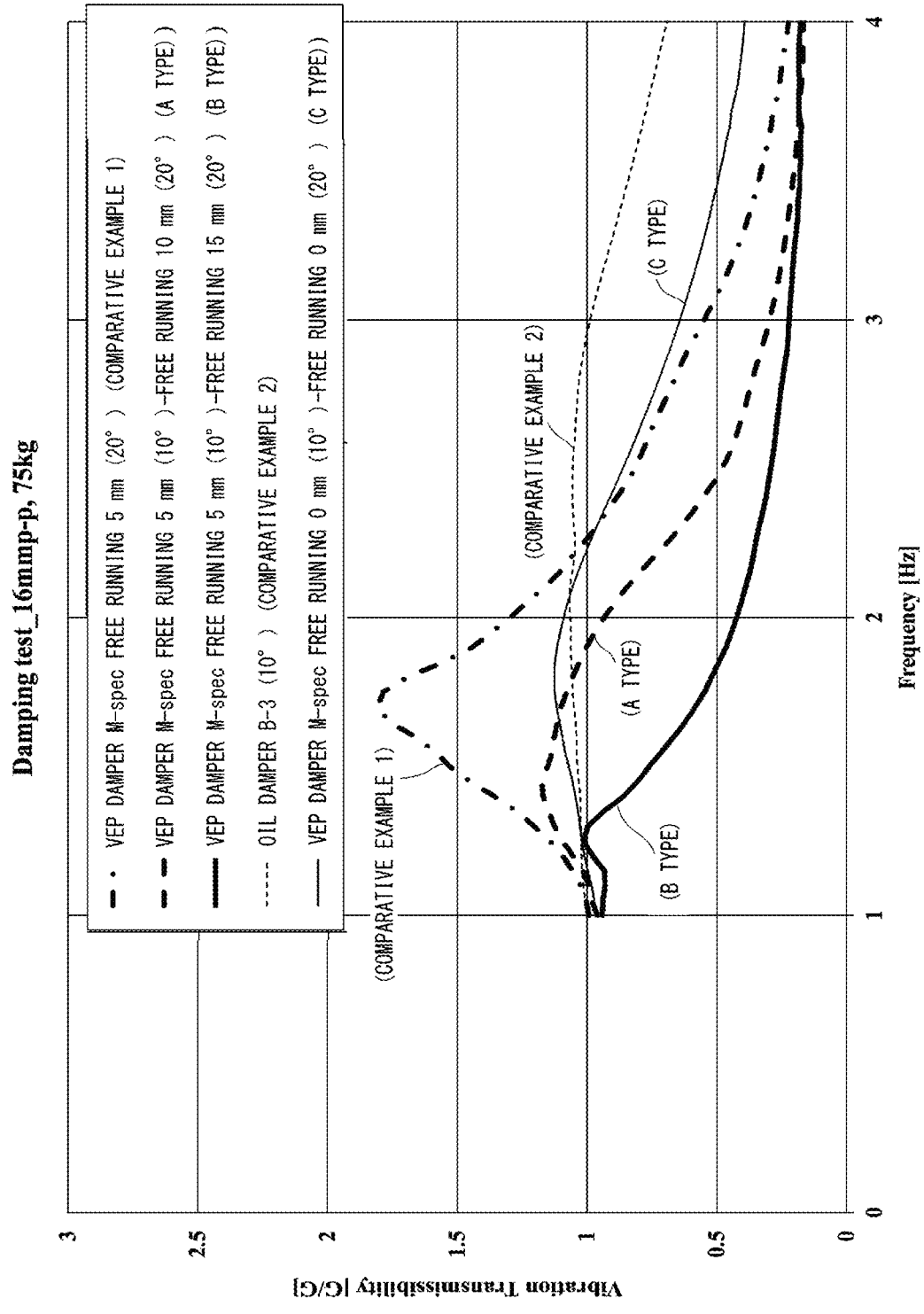
FIG. 17 is a chart illustrating test results of vibration transmissibilities measured after placing the rubber weight of 75 kg on the suspension mechanisms without supporting the seat.

FIG. 17 illustrates test results of vibration transmissibilities measured after placing the rubber weight of 75 kg directly on the upper frame 120 of the suspension mechanism 1 without mounting the seat 1000 on the suspension mechanism 1 of this embodiment. Note that an input vibration has a sinusoidal sweep waveform with the total amplitude of 16 mm similarly to the above.

Further, as the suspension mechanism 1, other than two kinds of the A type and the B type in which the distances of the free running zone of the aforesaid second dampers 160 were made different from each other, on a suspension mechanism (C type) in which distances of free running zones of both of the first damper 150 and the second damper 160 were set to 0 mm, the test was also carried out.

Further, on a suspension mechanism in which only one damper having the same configuration as those of the aforesaid dampers 150, 160, in which a distance of a free running zone was 5 mm, was mounted at a mounting angle of 20 degrees (Comparative example 1) and a suspension mechanism in which only one oil damper (an extension-side damping force of 400 N, a compression-side damping force of 200 N) was mounted at a mounting angle of 10 degrees (Comparative example 2), a similar test was also carried out.

From FIG. 17, first, in the suspension mechanisms 1 of the A type, the B type and the C type in each of which the two dampers 150, 160 are used with their mounting angles different from each other, differently from Comparative examples 1, 2, vibration transmissibilities at 1 Hz are each less than 1. As compared with Comparative examples 1, 2, this indicates that a phase shift occurs, and this causes an opposite phase in a resonant region, which indicates that the vibration transmissibilities in the resonant region are suppressed low.

As a result, a resonant frequency is about 1.4 Hz and a vibration transmissibility at this time is about 1.2 in the A type, a resonant frequency is about 1.2 Hz and a vibration transmissibility at this time is about 1.0 in the B type, and in both of the types, the resonant frequencies are close to a low frequency, the vibration transmissibilities are low, and the vibration transmissibilities in a frequency band of 2 Hz or more are also very low.

Further, in the suspension mechanism 1 of the C type, a resonant frequency was about 1.8 Hz and close to a high frequency as compared with the A type and the B type, but the vibration transmissibility at the time of resonance was low to be about 1.1. However, since the vibration transmissibility in a frequency band exceeding 2 Hz is high as compared with the A type and the B type, it is hard to satisfy the standard of EM8 in which a dominant frequency is 3.3 Hz, and the A type and the B type each using the dampers having the free running zones are more preferable.

That is, in a case of the A type and the B type each using the dampers having the free running zones, in the free running zones, the dampers' own spring constants do not act, and an effect of a natural frequency of the spring mechanism 140 (the torsion bars 141, 141 and the magnetic spring 142) is large, which makes the resonant frequencies close to the low frequency, and it is found more preferable from this that not only the two dampers at different mounting angles are used but also the dampers having the free running zones are further employed.

Further, in a case of Comparative example 1, a resonant frequency was about 1.7, and a vibration transmissibility at this time was about 1.7, which was higher than any of the vibration transmissibilities in the suspension mechanisms 1

(A type, B type, C type) each using the two dampers of this embodiment. On the other hand, in a case of Comparative example 2 using the oil damper, though a resonance peak was low, the vibration transmissibility did not decrease very much even in a frequency band of 2.5 Hz or more. It was confirmed from the above that the suspension mechanism 1 of this embodiment was better for a point of a vibration transmission characteristic.

Next, the seat 1000 was mounted on the suspension mechanisms 1 produced by variously combining distances of the free running zones of the dampers 150, 160 at the mounting angles of 10 degrees, 20 degrees, and the vibration test was carried out after seating a subject with a weight of 63 kg thereon, to confirm optimal combinations of the distances of the free running zones. Table 2 presents the results. Incidentally, in a vertical column, the distances of the free running zone of the first damper 150 at the mounting angle of 10 degrees are indicated by 5 mm, 10 mm, 15 mm, 20 mm in order from the top, and in a horizontal column, the distances of the free running zone of the second damper 160 at the mounting angle of 20 degrees are indicated by 5 mm, 10 mm, 15 mm, 20 mm in order from the left.

TABLE 2

Subject: JM63

Damper mounting angle 20°
Kind of damper
Second damper 160
Free running distance

| | | | | | | 5 mm | | 10 mm | |
|---|---|---|---|---|---|---|---|---|---|
| 10° | First damper 150 | 5 mm | Damping test | Resonant frequency | | | 1.4 | | 1.8 |
| | | | | Transmissibility | | 1.072 | | 1.227 | |
| | | | SEAT value PIP2.0 | EM7 | | 0.948 | | 0.926 | |
| | | | | Topping | | −1.160 | | −1.037 | |
| | | | | Bottoming | | 1.986 | | 1.818 | |
| | | | SEAT value | EM6 | | 0.617 | | 0.615 | |
| | | | | EM8 | | 0.874 | | 0.745 | |
| | | 10 mm | Damping test | Resonant frequency | | | 1.6 | | 1.6 |
| | | | | Transmissibility | | 1.528 | | 1.388 | |
| | | | SEAT value PIP2.0 | EM7 | | 1.011 | | 0.968 | |
| | | | | Topping | | −1.216 | | −1.206 | |
| | | | | Bottoming | | 1.852 | | 2.152 | |
| | | | SEAT value | EM6 | | 0.643 | | 0.654 | |
| | | | | EM8 | | 0.836 | | 0.845 | |
| | | 15 mm | Damping test | Resonant frequency | | | 1.65 | | 1.55 |
| | | | | Transmissibility | | 1.746 | | 1.621 | |
| | | | SEAT value PIP2.0 | EM7 | | 1.015 | | 0.971 | |
| | | | | Topping | | −1.331 | | −1.355 | |
| | | | | Bottoming | | 2.085 | | 2.312 | |
| | | | SEAT value | EM6 | | 0.671 | | 0.692 | |
| | | | | EM8 | | 0.888 | | 0.894 | |
| | | 20 mm | Damping test | Resonant frequency | | | 1.65 | | 1.7 |
| | | | | Transmissibility | | 1.845 | | 1.861 | |
| | | | SEAT value PIP2.0 | EM7 | | 0.905 | | 0.860 | |
| | | | | Topping | | −1.414 | | −1.415 | |
| | | | | Bottoming | | 2.231 | | 2.404 | |
| | | | SEAT value | EM6 | | 0.661 | | 0.654 | |
| | | | | EM8 | | 0.830 | | 0.847 | |

Damper mounting angle 20°
Kind of damper
Second damper 160
Free running distance

| | | | | | | 15 mm | | 20 mm | |
|---|---|---|---|---|---|---|---|---|---|
| 10° | First damper 150 | 5 mm | Damping test | Resonant frequency | | | 1.7 | | 1.45 |
| | | | | Transmissibility | | 1.109 | | 1.457 | |
| | | | SEAT value PIP2.0 | EM7 | | 0.844 | | 0.945 | |
| | | | | Topping | | −1.034 | | −1.414 | |
| | | | | Bottoming | | 1.849 | | 2.231 | |
| | | | SEAT value | EM6 | | 0.664 | | 0.677 | |
| | | | | EM8 | | 0.790 | | 0.814 | |
| | | 10 mm | Damping test | Resonant frequency | | | 1.4 | | 1.45 |
| | | | | Transmissibility | | 1.254 | | 1.397 | |
| | | | SEAT value PIP2.0 | EM7 | | 1.009 | | −1.358 | |
| | | | | Topping | | −1.344 | | 2.475 | |
| | | | | Bottoming | | 1.786 | | 2.475 | |

TABLE 2-continued

Subject: JM63

|  |  |  |  |  |  |  |
|---|---|---|---|---|---|---|
|  | SEAT value | EM6 | 0.696 | SEAT value | EM6 | 0.642 |
|  |  | EM8 | 0.834 |  | EM8 | 0.835 |
| 15 mm | Damping test | Resonant frequency | 1.4 | Damping test | Resonant frequency | 1.4 |
|  |  | Transmissibility | 1.254 |  | Transmissibility | 1.457 |
|  | SEAT value | EM7 | 1.040 | SEAT value | EM7 | 0.887 |
|  | PIP2.0 | Topping | −1.418 | PIP2.0 | Topping | −1.510 |
|  |  | Bottoming | 2.783 |  | Bottoming | 2.544 |
|  | SEAT value | EM6 | 0.687 | SEAT value | EM6 | 0.690 |
|  |  | EM8 | 0.862 |  | EM8 | 0.809 |
| 20 mm | Damping test | Resonant frequency | 1.45 | Damping test | Resonant frequency | 1.4 |
|  |  | Transmissibility | 1.678 |  | Transmissibility | 1.449 |
|  | SEAT value | EM7 | 0.886 | SEAT value | EM7 | 0.885 |
|  | PIP2.0 | Topping | −1.469 | PIP2.0 | Topping | NG |
|  |  | Bottoming | 2.664 |  | Bottoming | (Stop due to large bottoming) |
|  | SEAT value | EM6 | 0.627 | SEAT value | EM6 | 0.658 |
|  |  | EM8 | 0.817 |  | EM8 | 0.858 |

SEAT value:
EM6 < 0.7
EM7 < 0.6
EM8 < 0.8
Damping test:
EM6 < 1.5
EM7, EM8 < 2.0

From Table 2, also in the main test, only the aforesaid A-type suspension mechanism 1 of "the distance of the free running zone of the first damper 150: 5 mm, the distance of the free running zone of the second damper 160: 10 mm" and the aforesaid B-type suspension mechanism 1 of "the distance of the free running zone of the first damper 150: 5 mm, the distance of the free running zone of the second damper 160: 15 mm" satisfied the standards of the SEAT values and the vibration transmissibilities of EM6, EM8, and the combinations of these distances of the free running zones were proven to be optimal.

Figure 18:
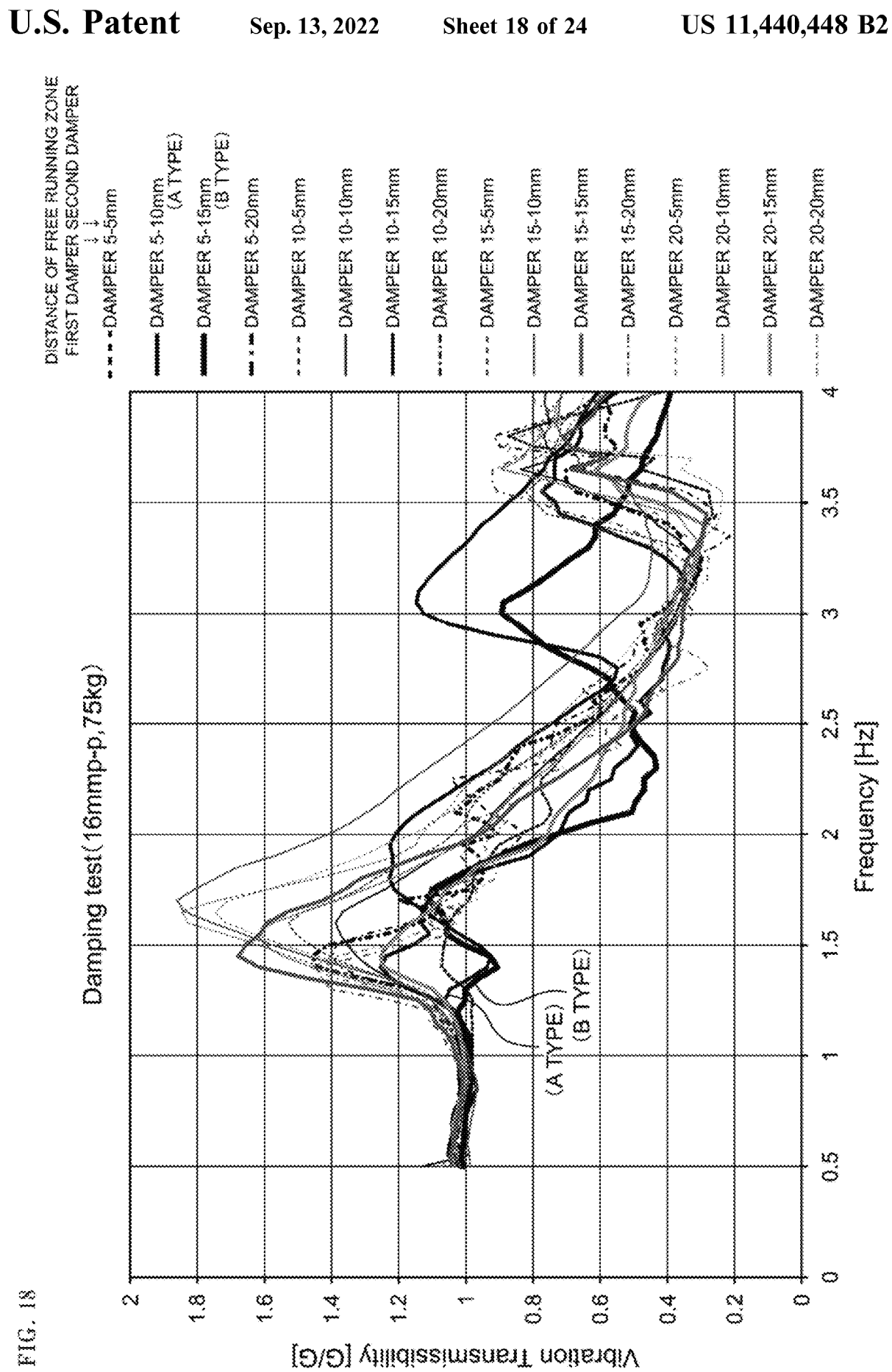
FIG. 18 is a chart illustrating test results of vibration transmissibilities measured after supporting the seat on suspension mechanisms in which distances of free running zones of the first and second dampers are varied to be combined and placing the rubber weight of 75 kg on this seat.

Further, FIG. 18 illustrates results of the vibration test carried out by placing the rubber weight of 75 kg on the seat 1000 mounted on the suspension mechanisms 1 having the dampers 150, 160 combined variously in Table 2 and using the sinusoidal sweep waveform with the total amplitude of 16 mm.

Also in the results, it is found that ones using the aforesaid A-type suspension mechanism 1 of "the distance of the free running zone of the first damper 150: 5 mm, the distance of the free running zone of the second damper 160: 10 mm" and the aforesaid B-type suspension mechanism 1 of "the distance of the free running zone of the first damper 150: 5 mm, the distance of the free running zone of the second damper 160: 15 mm" each have a low vibration transmissibility in the resonant region and are the most excellent in the vibration characteristic.

Figure 19:
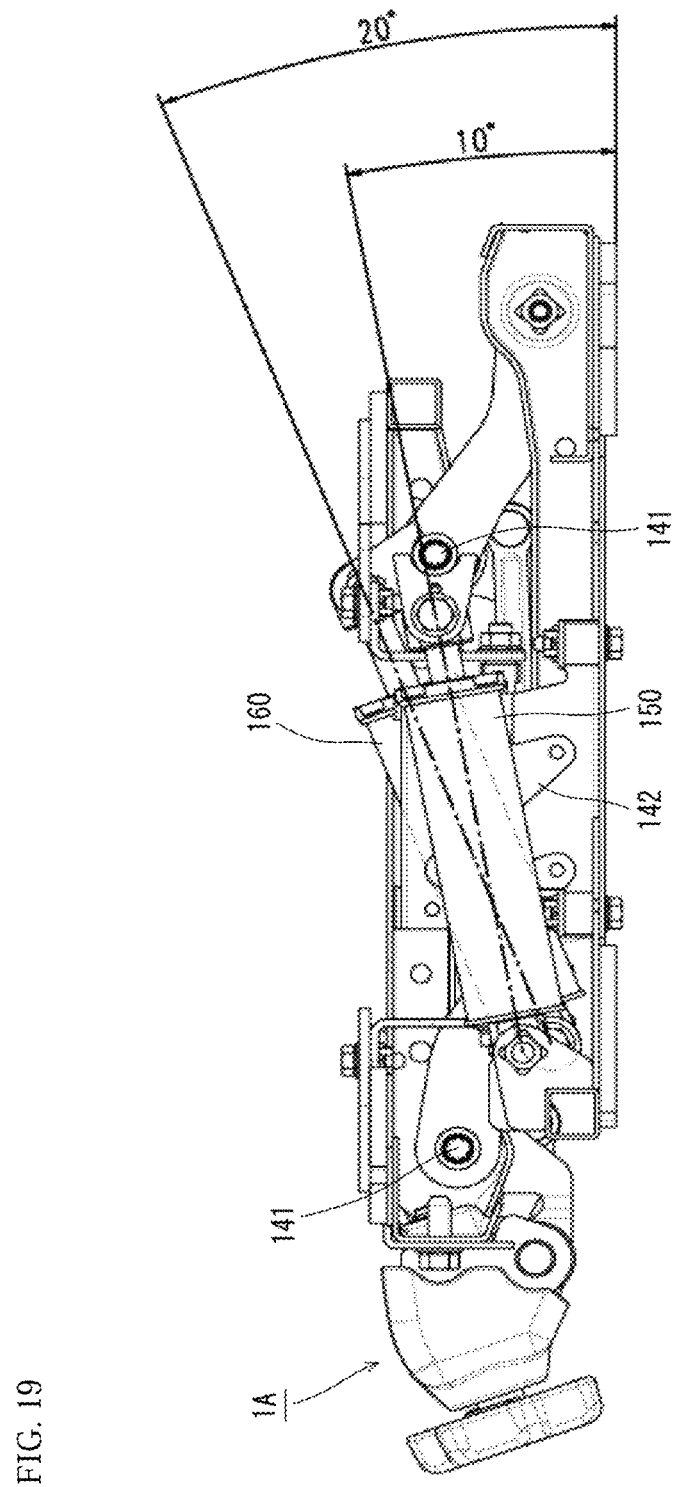
FIG. 19 is a side view illustrating a suspension mechanism according to another embodiment of the present invention.
Figure 20:
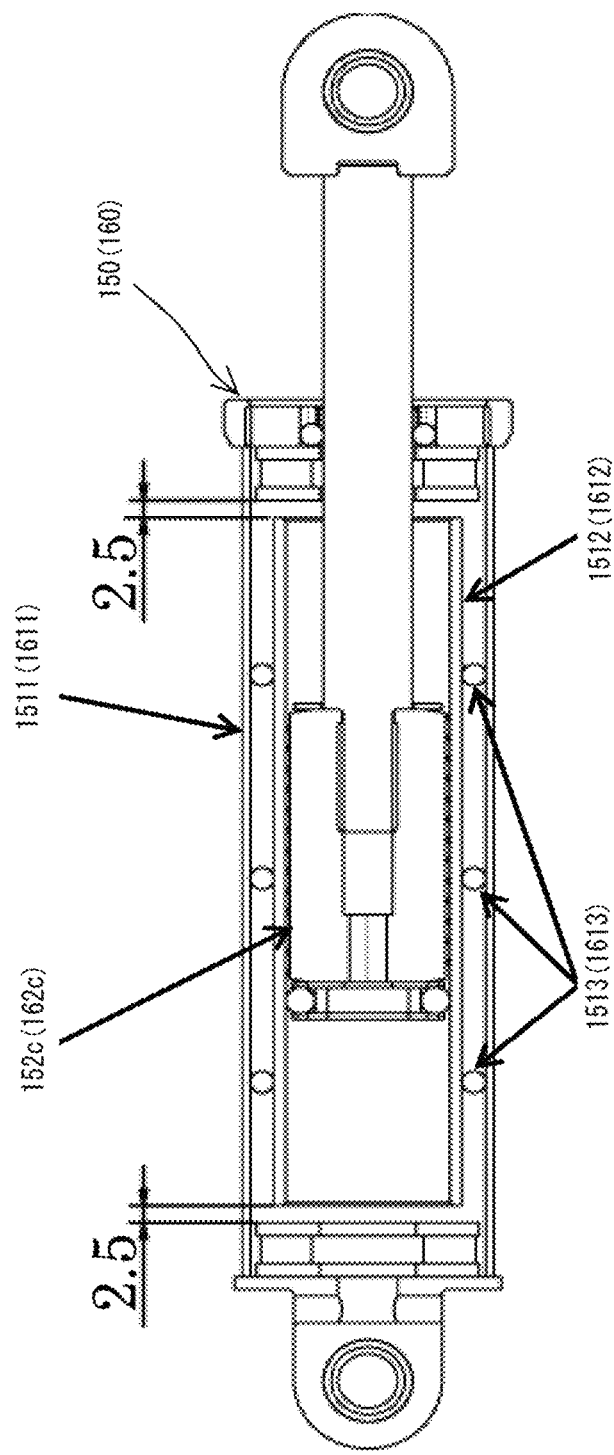
FIG. 20 is a sectional view for explaining a structure of dampers used in the other embodiment in FIG. 19.

Next, a suspension mechanism 1A having a structure different in the following points was produced though similar to the aforesaid B-type suspension mechanism 1 in that it was set to "the distance of the free running zone of the first damper 150: 5 mm, the distance of the free running zone of the second damper 160: 15 mm" (refer to FIG. 19), to evaluate its characteristics. That is, first, the suspension mechanism 1A of this embodiment was configured to make the string portions 152c, 162c of the first damper 150 and the second damper 160 different from those of the above-described embodiment, resulting in increasing resistance. Specifically, the same thread as that in the above-described embodiment was similarly wound into the string portions 152c, 162c, but the tread in this embodiment was wound so as to have high density by bringing adjacent portions into closer contact with each other. Next, the low-friction members 1513, 1613 loaded between the inner movable cylinders 1512, 1612 and the outer stationary cylinders 1511, 1611 were set as balls made of metal as illustrated in FIG. 20. Note that FIG. 20 illustrates the first damper 150 having the free running zone of 5 mm, and the second damper 160 also has a similar structure. Further, as illustrated in FIG. 19, the mounting angles of the dampers 150, 160 are the same as those in the above-described embodiment, and the mounting angle of the first damper 150 is 10 degrees (to be accurate, 10.5 degrees) and the mounting angle of the second damper 160 is 20 degrees (to be accurate, 21 degrees). In addition, the total stroke in the up-down direction is 40 mm. The other configuration is also similar to that of the aforesaid B-type suspension mechanism 1.

(Damping Characteristic of Damper)

Figure 21:
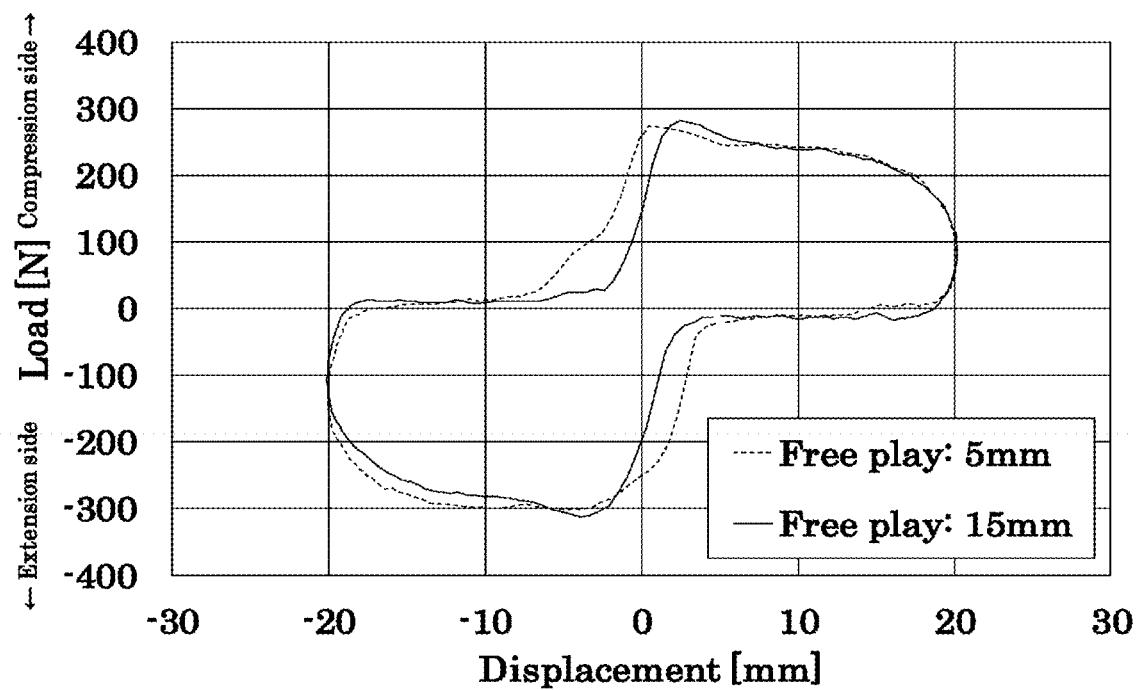
FIG. 21 is Lissajous figures of force and displacement which exhibit a damping characteristic of the dampers in FIG. 20.

FIG. 21 illustrates Lissajous figures of the first damper 150 having the free running zone of 5 mm and the second damper 160 having the free running zone of 15 mm which are used in this embodiment. The measurement was made with a sine wave whose speed is 0.2 m/s at the time of a 0 mm displacement amount. The free running zone of 5 mm or 15 mm (in the chart, represented as "Free play") occurs in an extension direction or a compression direction from a state where stroke speeds of the first damper 150 and the second damper 160 are each 0 m/s. The damping force rose moderately after passing through the free running zone, to generate a damping force of about 300 N. Accordingly, in both of the first damper 150 and the second damper 160 of this embodiment, the damping force is larger than that in the above-described embodiment. The bottoming is reduced by the first damper 150 at the mounting angle of 10 degrees, and the phase in the resonant region is controlled by the second damper 160 at the mounting angle of 20 degrees.

(Load-Deflection Characteristic)

Figure 22:
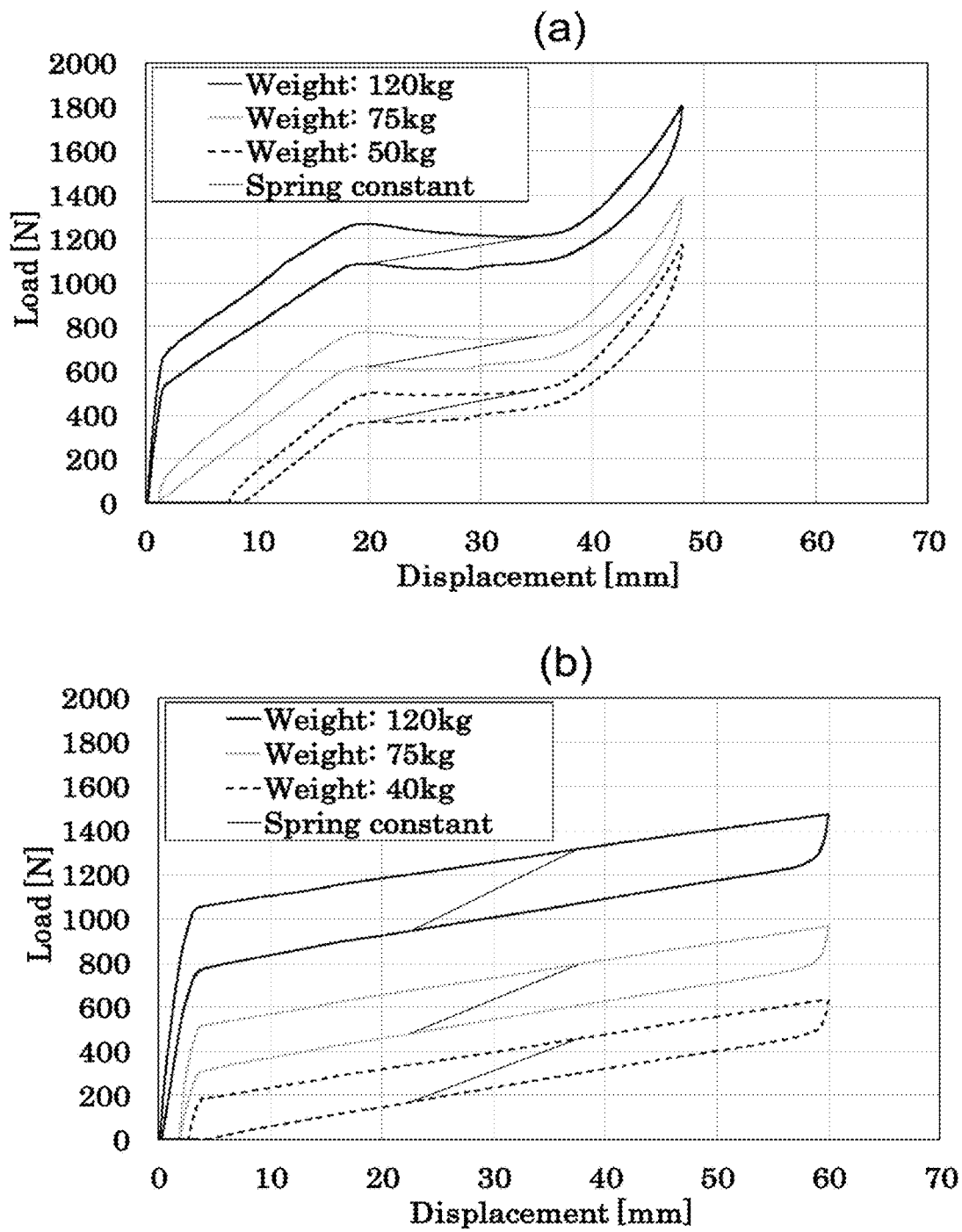
FIG. 22(*a*) is a chart illustrating a load-deflection characteristic of the suspension mechanism according to the other embodiment in FIG. 19, and FIG. 22(*b*) is a chart illustrating an example of a load-deflection characteristic of a standard-type suspension mechanism according to a comparative example.

FIG. 22(a) illustrates a load-deflection characteristic of the suspension mechanism 1A of this embodiment. Similarly to the above-described embodiment, a dead zone range of about 15 mm is created by a combination of a high spring constant of the torsion bars 141 and a negative spring constant of the magnetic spring 142. Spring constants in the dead zone range were 8506 to 9305 N/m, and hysteresis losses were 112 to 161 N. The smaller load mass is, the more important the hysteresis loss is, and in this example, the hysteresis loss was 112 N in a case of the smallest load mass of 50 kg.

Incidentally, as resonance characteristics for satisfying the SEAT values of the aforesaid EM6, EM8, EM9 and passing the damping test, according to the test carried out by the present inventor, it is necessary that a gain at a resonance peak is 1.2±0.2, a resonant frequency is 1.4 Hz or less, a gain is below 1.0 in the vicinity of 2.0 Hz, a gain in 3.0 to 7.0 Hz is less than 0.8, and a gain at 7.0 Hz or more is less than 0.7, and in order to satisfy the characteristics, as the hysteresis loss in the load-deflection characteristic, 100 N is an optimal value. The aforesaid 112 N is a sufficient tolerance range of this 100 N.

As a comparison, FIG. 22(b) illustrates a load-deflection characteristic of a conventionally well-known standard-type suspension mechanism (comparative example) which is moved up and down by an X-link mechanism and formed by arranging a soft metal spring and an oil damper between upper and lower members and whose up-down stroke is 60 mm. As is obvious from this chart, the spring characteristic indicated a line shape and had no dead zone range, and vibration was damped by making use of damping force of the damper and a long stroke of 60 mm, resulting in that spring constants at a balanced point were 19214 to 24737 N/m and hysteresis losses were 159 to 250 N.

(Vibration Test)

In order to confirm vibration absorbing performance around the resonance point of the suspension mechanism 1A, a vibration evaluation test based on the standard of ISO 7096: 2000 was carried out. An excited wave for the vibration evaluation test had a sinusoidal sweep waveform (0.5 to 4.0 Hz), and an input amplitude was set to a displacement amplitude of ±8.0 mm equivalent to 40% of 40 mm of the total stroke amount of the suspension mechanism 1A. On the suspension mechanism 1A, a surface plate was assembled in place of the seat, and a 75 kg weight made of metal was placed thereon, also to evaluate the SEAT value.

An excitation waveform of EM6, EM8 or EM9 was used, and the evaluation of the SEAT value was made on three subjects (a subject A: a body height of 171 cm, a weight of 63 kg, a subject B: a body height of 173 cm, a weight of 55 kg, a subject C: a body height of 179 cm, a weight of 99 kg). Incidentally, the subjects were selected with a mass of the surface plate+8 kg converted to a seat weight. A vibrator used for the vibration evaluation test was a six-axis vibrator manufactured by DELTA TOOLING CO., LTD., and a triaxial vibrator manufactured by IMV Corp. was used in the measurement of the SEAT value. Further, for a comparison, the vibration evaluation test was also carried out similarly on the standard-type suspension mechanism (comparative example) having the load-deflection characteristic in FIG. 22(b).

Figure 23:
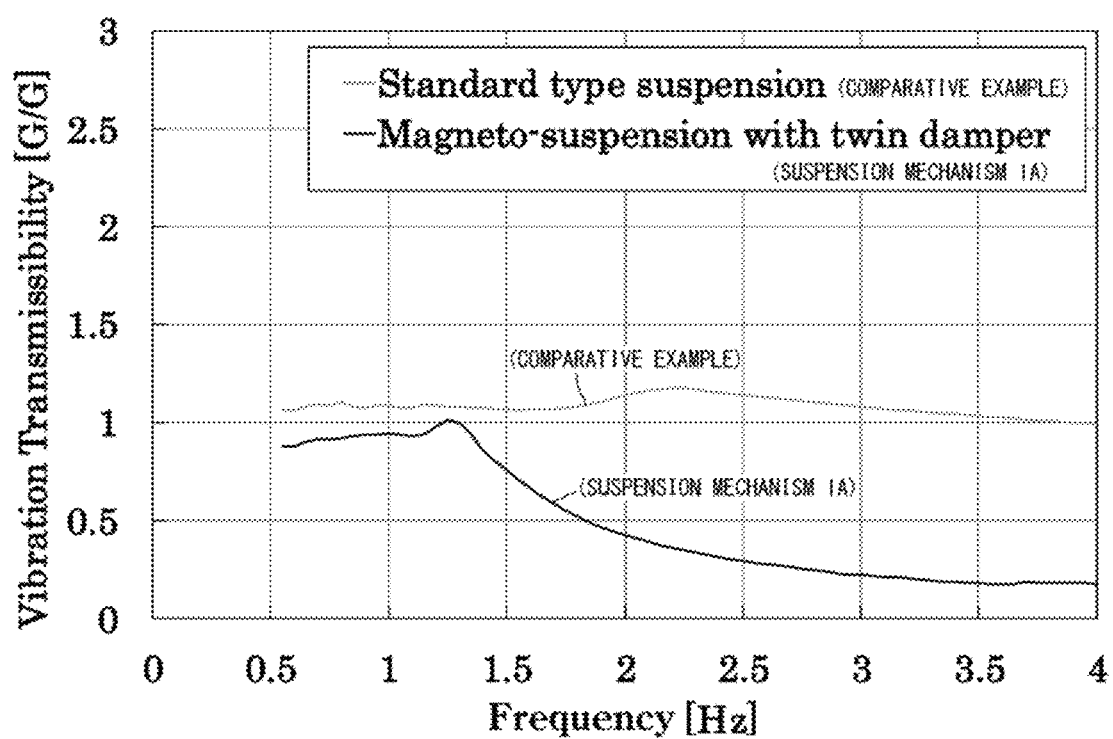
FIG. 23 is a chart illustrating results of a vibration evaluation test.

FIG. 23 illustrates vibration transmissibilities of the suspension mechanism 1A of this embodiment and the standard-type suspension mechanism (comparative example) in a state of the absence of the seat. In the standard-type suspension mechanism (comparative example), a resonant frequency is 2.2 Hz, a gain at a resonance peak is 1.2, but a gain exceeds 1.0 until 3.9 Hz. This is that friction force of the standard-type suspension mechanism (comparative example) is large to thus exhibit a characteristic such as a rigid body. On the other hand, in the suspension mechanism 1A of this embodiment, a resonant frequency is 1.3 Hz, a gain at a resonance peak is 1.0, and a gain at 1.8 Hz is below 0.5. Further, a gain is below 1.0 between 0 and 1.3 Hz. This phenomenon is attributed to the fact that a vibration damping function acts since before reaching a resonance point even at low input acceleration due to a synergistic effect of using the two dampers 150, 160 having the free running zones and having a characteristic difference therebetween and the suspension mechanism 1A having a dead zone range. The suspension mechanism 1A exhibits the vibration damping function across the entire range from low input acceleration to high input acceleration, and such vibration control as active control can be said to be performed in a passive state.

Table 3 presents SEAT values regarding EM6, EM8 on the subject A which are evaluated by placing the seat on the suspension mechanism 1A of this embodiment and the conventionally well-known standard-type suspension mechanism (comparative example).

TABLE 3

| Input spectral class | EM6 | | EM8 | |
|---|---|---|---|---|
| Excitation center frequency [Hz] | 7.6 | | 3.3 | |
| Max PSD [(m/s$^2$)$^2$/Hz] | 0.34 | | 0.4 | |
| S.E.A.T value (less than) | <0.7 | | <0.8 | |
| Subject | JM63 | | | |
| Suspension type | Standard type suspension (Comparative example) | Magneto* suspension with twin damper (Suspension mechanism 1A) | Standard type suspension (Comparative example) | Magneto* suspension with twin damper (Suspension mechanism 1A) |
| Calculated S.E.A.T value | 0.88 | 0.63 | 0.97 | 0.79 |

It is found from Table 3 that the suspension mechanism 1A of this embodiment satisfies the standards of the SEAT values also regarding both of EM6 and EM8.

Table 4 presents the evaluation regarding EM6, EM8 and EM9 on the subjects B, C which is made by placing the seat on the suspension mechanism 1A of this embodiment.

TABLE 4

| Input spectral class | EM6 | | EM8 | | EM9 | |
|---|---|---|---|---|---|---|
| Excitation center frequency [Hz] | 7.6 | | 3.3 | | 4.0 | |
| Max PSD [(m/s$^2$)$^2$/Hz] | 0.34 | | 0.4 | | 0.78 | |
| S.E.A.T value (less than) | <0.7 | | <0.8 | | <0.9 | |
| Subject | JM55 | JM99 | JM55 | JM99 | JM55 | JM99 |
| Suspension type | Magneto-suspension with twin damper (Suspension mechanism 1A) | | | | | |
| Calculated S.E.A.T value | 0.34 | 0.35 | 0.68 | 0.59 | 0.52 | 0.44 |
| Transmissibility of damping test (less than) [G/G] | <1.5 | | <2.0 | | <2.0 | |
| Measurement value of transmissibility [G/G] | | | 1.45 | | | |

It is found from Table 4 that the SEAT values satisfy the standards in both of the subjects and a vibration transmissibility also satisfies the standards.

Consequently, according to the suspension mechanism 1A of this embodiment, the one mechanism can satisfy the standard regarding any of EM6, EM8 and EM9.

Figure 24:
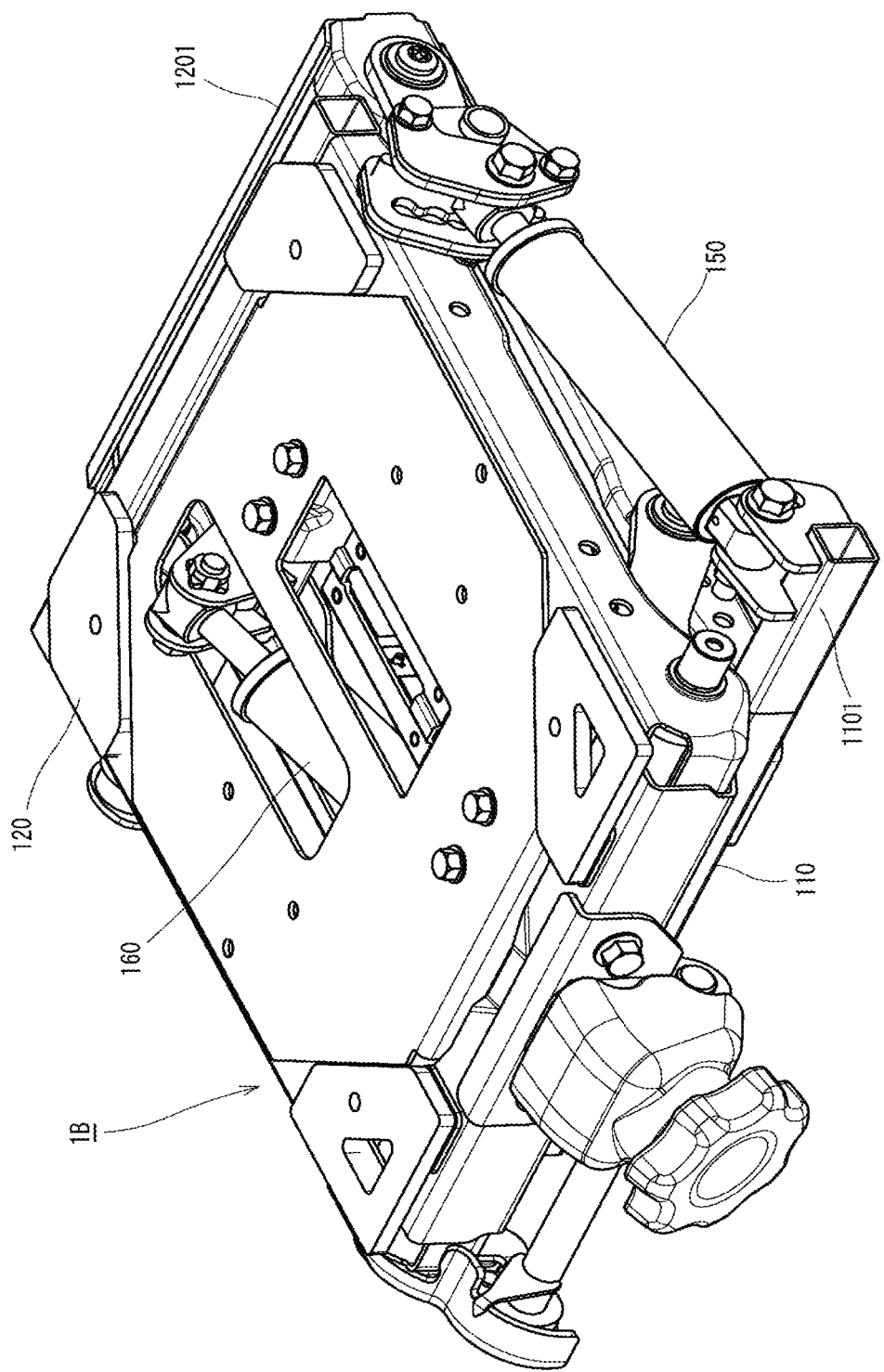
FIG. 24 is a perspective view illustrating another example of the suspension mechanism of the present invention.

Further, in the above-described embodiment, both of the first and second dampers 150, 160 are provided within the upper plate 120a covering the upper surface of the substantially square frame-shaped upper frame 120, but such a layout is just an example, for example, such as a suspension mechanism 1B illustrated in FIG. 24, it is also possible to have a configuration to provide a laterally-projecting lower projecting frame portion 1101 at the front side of the lower frame 110 and also provide a laterally-projecting upper projecting frame portion 1201 at the rear portion of the rear frame 120 in the same manner as the above, to suspend the first damper 150 between these lower projecting frame portion 1101 and upper projecting frame portion 1201. They are appropriately determined in is consideration of disposition space and the like, and in place of the first damper 150, or with the first damper 150, the second damper 160 can be, as a matter of course, arranged in laterally-projecting positions on the opposite side.

In addition, the dampers having the free running zones, which are used as the first and second dampers 150, 160, are not limited to the above, and can be used for absorption of energy at the time of operation of various controlled objects. For example, the damper can also be arranged for an opening/closing mechanism such as a rear hatch and a door of an automobile, or the like and used for making the damping force act only in a predetermined range in an opening/closing operation range.

Explanation of Reference Signs 1, 1A, 1B suspension mechanism
10 multi-suspension mechanism
110 lower frame
120 upper frame
130 link mechanism
131 front link
132 rear link
140 spring mechanism
141 torsion bar
142 magnetic spring
150 first damper
160 second damper

The invention claimed is:

1. A suspension mechanism disposed between a vehicle body structure and a seat, the suspension mechanism comprising:
a link mechanism which supports an upper frame mounted on the seat side to be movable up and down relative to a lower frame mounted on a vehicle body structure side;
a spring mechanism which elastically biases the upper frame relative to the lower frame; and
a damper which exhibits damping force to absorb energy when the upper frame moves up and down relative to the lower frame,
wherein the damper is
a telescopic one including a cylinder and a piston which moves relatively in the cylinder in accordance with up-down movement of the upper frame relative to the lower frame, and
suspended in plurality in parallel at different mounting angles between the upper frame and the lower frame, and
wherein in at least one of the plurality of dampers, a moving zone of the piston in the cylinder corresponding to a predetermined up-down movement range including a balanced point when the upper frame moves up and down relative to the lower frame is a free running zone where the damping force does not act.

2. The suspension mechanism according to claim 1, Wherein the free running zone is set in the plurality of dampers, and distances of the free running zones in at least the two dampers are different from each other.

3. The suspension mechanism according to claim 2,
wherein the cylinder has an outer stationary cylinder linked to one of the upper frame and the lower frame and an inner movable cylinder provided to be movable in the outer stationary cylinder,
wherein the piston is arranged in the inner movable cylinder and supported by a piston rod linked to the other of the upper frame and the lower frame,
wherein, around an outer peripheral surface of the piston, a linear member which exhibits friction damping force between the inner movable cylinder and the piston is wound, and a viscous fluid is made to adhere to the linear member,
wherein the linear member has a function in which tension is changed by relative movement of the piston in the cylinder, thereby changing friction damping force between the linear member and the inner movable cylinder and viscous damping force of the viscous fluid, and
wherein the damping force is exhibited when the inner movable cylinder does not move relatively in the outer stationary cylinder and the piston moves relatively in the inner movable cylinder.

4. The suspension mechanism according to claim 1, wherein the spring mechanism has a characteristic in whith a change amount of a load value is a constant load equal to or less than a predetermined amount in a predetermined up-down movement range including the balanced point as a load-deflection characteristic When the upper frame moves up and down relative to the lower frame.

5. The suspension mechanism according to claim 4, wherein the spring mechanism includes:
a linear spring which exhibits a linear characteristic; and
a magnetic spring which includes stationary magnets and a movable magnet whose relative position to the stationary magnets is displaced in accordance with up-down movement of the upper frame relative to the lower frame, and exhibits a nonlinear characteristic in which a spring constant is changed depending on a relative position of the stationary magnets and the movable magnet, and
wherein a load-deflection characteristic of a combination of the linear spring and the magnetic spring includes a characteristic of being the constant load in a displacement range corresponding to a predetermined up-down movement range including the balanced point of the upper frame.

6. The suspension mechanism according to claim 4, wherein a low-repulsion material is provided for at least either of portions where the upper frame and the lower frame come close to each other at a stroke end in an up-down movement direction.

7. The suspension mechanism according to claim 1, wherein a low-repulsion material is provided at stroke ends in a relative movement direction between the cylinder and the piston.

8. A multi-suspension mechanism comprising:
the suspension mechanism according to claim 1; and
another suspension mechanism stacked on the suspension mechanism.

9. The multi-suspension mechanism according to claim 8, wherein the suspension mechanism and the another suspension mechanism are identical.

10. A damper being a telescopic damper including a cylinder and a piston which moves relatively in the cylinder,
wherein the cylinder has an outer stationary cylinder linked to one of controlled objects and an inner movable cylinder provided to be movable in the outer stationary cylinder,
wherein the piston is arranged in the inner movable cylinder and supported by a piston rod linked to the other of the controlled objects,
wherein, around an outer peripheral surface of the piston, a linear member which exhibits friction damping force between the inner movable cylinder and the piston is wound, and a viscous fluid is made to adhere to the linear member,
wherein the linear member has a function in which tension is changed according to the relative movement, thereby changing friction damping force between the linear member and the inner movable cylinder and viscous damping force of the viscous fluid, and
wherein a predetermined damping force is exhibited in a case where the inner movable cylinder does not move relatively in the outer stationary cylinder and the piston moves relatively in the inner movable cylinder.

11. The damper according to claim 10,
wherein the inner movable cylinder is longer in axial-direction length than the piston, and
wherein the inner movable cylinder moves relatively with the piston in the outer stationary cylinder until each end portion thereof abuts on either of a stopper portion on one end side and a stopper portion on the other side of the outer stationary cylinder, and after abutting on either of the stopper portions, when the piston moves relatively in the inner movable cylinder, the predetermined damping force acts.

12. The damper according to claim 11, wherein a low-repulsion material is provided at stroke ends in a relative movement direction between the cylinder and the piston.

* * * * *